United States Patent
Teyeb et al.

(10) Patent No.: US 11,785,511 B2
(45) Date of Patent: Oct. 10, 2023

(54) INTER-RAT (RADIO ACCESS TECHNOLOGY) RE-ESTABLISHMENT ENHANCEMENTS IN MULTI-RAT DUAL CONNECTIVITY (MR-DC)

(71) Applicant: TELEFONAKTIEBOLAGET LM ERICSSON (PUBL), Stockholm (SE)

(72) Inventors: Oumer Teyeb, Solna (SE); Patrik Rugeland, Stockholm (SE); Icaro L. J. Da Silva, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 345 days.

(21) Appl. No.: 17/273,124

(22) PCT Filed: Oct. 8, 2019

(86) PCT No.: PCT/SE2019/050983
§ 371 (c)(1),
(2) Date: Mar. 3, 2021

(87) PCT Pub. No.: WO2020/076228
PCT Pub. Date: Apr. 16, 2020

(65) Prior Publication Data
US 2021/0211952 A1    Jul. 8, 2021

Related U.S. Application Data

(60) Provisional application No. 62/743,340, filed on Oct. 9, 2018.

(51) Int. Cl.
*H04W 36/00*    (2009.01)
*H04W 76/19*    (2018.01)
(Continued)

(52) U.S. Cl.
CPC ..... *H04W 36/0069* (2018.08); *H04W 12/108* (2021.01); *H04W 36/14* (2013.01);
(Continued)

(58) Field of Classification Search
CPC . H04W 36/0069; H04W 76/19; H04W 76/15; H04W 36/305; H04W 12/108;
(Continued)

(56) References Cited

U.S. PATENT DOCUMENTS

| | | | |
|---|---|---|---|
| 2020/0119799 A1* | 4/2020 | Jung | H04W 52/36 |
| 2020/0260304 A1* | 8/2020 | Zhou | H04W 72/23 |
| 2020/0267794 A1* | 8/2020 | Baek | H04W 76/27 |

FOREIGN PATENT DOCUMENTS

| | | |
|---|---|---|
| EP | 2645804 A1 | 10/2013 |
| WO | 2016045625 A2 | 3/2016 |
| WO | 2018029621 A1 | 2/2018 |

OTHER PUBLICATIONS

"3rd Generation Partnership Project; Technical Specification Group Radio Access Network;" Evolved Universal Terrestrial Radio Access (E-UTRA); Radio Resource Control (RRC); Protocol specification, Release 15, 3GPP TS 36.331 V15.3.0, Sep. 2018, pp. 1-918.
(Continued)

*Primary Examiner* — Mewale A Ambaye
(74) *Attorney, Agent, or Firm* — Christopher & Weisberg, P.A.

(57) ABSTRACT

Methods for a target node to establish a connection with a user equipment (UE) operating in dual connectivity (DC) with a primary cell (PCell) served by a master node and with a primary secondary cell (PSCell) served by a secondary node. The methods include receiving, from the UE, a re-establishment request message comprising parameters associated with the PSCell, a message authentication code, and an indication of the UE's selection of a target cell served by the target node as a replacement for the PCell, which
(Continued)

utilizes a first radio access technology (RAT). The PSCell and the target cell utilize a different second RAT. The methods include, based on the parameters associated with the PSCell, determining a full UE context for the UE, and establishing a connection with the UE based on the full UE context, whereby the target cell will serve as a PCell for DC.

16 Claims, 21 Drawing Sheets

(51) Int. Cl.
    *H04W 76/15*     (2018.01)
    *H04W 36/30*     (2009.01)
    *H04W 12/108*     (2021.01)
    *H04W 36/14*     (2009.01)

(52) U.S. Cl.
    CPC ......... *H04W 36/305* (2018.08); *H04W 76/15* (2018.02); *H04W 76/19* (2018.02)

(58) Field of Classification Search
    CPC . H04W 36/14; H04W 36/0033; H04W 69/14; H04W 36/0079; H04W 36/0003; H04L 5/0035
    See application file for complete search history.

(56) References Cited

OTHER PUBLICATIONS

"3rd Generation Partnership Project; Technical Specification Group Radio Access Network;" NR; Radio Resource Control (RRC) protocol specification, (Release 15), 3GPP TS 38.331 V15.3.0, Sep. 2018, pp. 1-445.
3GPP TSG-RAN WG2 Meeting #103, R2-1811461 (Revision of R2-1809606), Gothenburg, Sweden, Aug. 20-24, 2018, 5 pages.
International Search Report / Written Opinion dated Apr. 30, 2020 in related/corresponding PCT Application No. PCT/SE2019/050983.

* cited by examiner

```
-- ASN1START
RRCConnectionReestablishmentRequest ::=   SEQUENCE {
    criticalExtensions                    CHOICE {
        rrcConnectionReestablishmentRequest-r8    RRCConnectionReestablishmentRequest-r8-IEs,
        criticalExtensionsFuture                  SEQUENCE {}
    }
}

RRCConnectionReestablishmentRequest-r8-IEs ::= SEQUENCE {
    ue-Identity                   ReestabUE-Identity,
    reestablishmentCause          ReestablishmentCause,
    spare                         BIT STRING (SIZE (2))
}

ReestabUE-Identity ::=            SEQUENCE {
    c-RNTI                        C-RNTI,
    physCellId                    PhysCellId,
    shortMAC-I                    ShortMAC-I
}

ReestablishmentCause ::=          ENUMERATED {
                                  reconfigurationFailure, handoverFailure,
                                  otherFailure, spare1}

-- ASN1STOP
```

*FIG. 6A*

```
-- ASN1START
C-RNTI ::=                        BIT STRING (SIZE (16))
-- ASN1STOP
```

*FIG. 6B*

```
-- ASN1START
PhysCellId ::=                    INTEGER (0..503)
-- ASN1STOP
```

*FIG. 6C*

```
-- ASN1START
-- TAG-RRCREESTABLISHMENTREQUEST-START

RRCReestablishmentRequest ::= SEQUENCE {
    rrcReestablishmentRequest       RRCReestablishmentRequest-IEs
}

RRCReestablishmentRequest-IEs ::= SEQUENCE {
    ue-Identity                 ReestabUE-Identity,
    reestablishmentCause        ReestablishmentCause,
    spare                       BIT STRING (SIZE (1))
}

ReestabUE-Identity ::=          SEQUENCE {
    c-RNTI                          RNTI-Value,
    physCellId                      PhysCellId,
    shortMAC-I                      ShortMAC-I
}

ReestablishmentCause ::=        ENUMERATED {
    reconfigurationFailure, handoverFailure, otherFailure, spare1}

-- TAG-RRCREESTABLISHMENTREQUEST-STOP
-- ASN1STOP
```

*FIG. 8A*

```
-- ASN1START
-- TAG-RNTI-VALUE-START

RNTI-Value ::=              INTEGER (0..65535)

-- TAG-RNTI-VALUE-STOP
-- ASN1STOP
```

*FIG. 8B*

```
-- ASN1START
-- TAG-PHYS-CELL-ID-START

PhysCellId ::=              INTEGER (0..1007)

-- TAG-PHYS-CELL-ID-STOP
-- ASN1STOP
```

*FIG. 8C*

| IE/Group Name | Presence | IE type/ref. | Semantics description |
|---|---|---|---|
| Message Type | M | 9.2.3.1 | |
| New NG-RAN node UE XnAP ID reference | M | NG-RAN node UE XnAP ID 9.2.3.16 | Allocated at the new NG-RAN node |
| UE Context ID | M | 9.2.3.40 | |
| Integrity protection | M | BIT STRING (SIZE (16)) | *ShortMAC-I* either contained in the *RRCConnection ResumeRequest* message or in the *RRCConnection ResumeRequest* message |
| New Cell Identifier | M | NG-RAN Cell Identity 9.2.2.9 | The Cell Identifier of the cell where the RRC connection has been requested to be resumed or to be re-established. |
| RRC Resume Cause | O | 9.2.3.61 | In case of RNA Update, contains the cause value provided by the UE in the *RRC ResumeRequest* message or in the *RRCConnection ResumeRequest* message, |

*FIG. 9A*

| IE/Group Name | Presence | IE type/ref. | Semantics description |
|---|---|---|---|
| Message Type | M | 9.2.3.1 | |
| New NG-RAN node UE XnAP ID reference | M | NG-RAN node UE XnAP ID 9.2.3.16 | Allocated at the new NG-RAN node |
| Old NG-RAN node UE XnAP ID reference | M | NG-RAN node UE XnAP ID 9.2.3.16 | Allocated at the old NG-RAN node |
| GUAMI | M | 9.2.3.24 | |
| UE Context Information Retrieve UE Context Response | M | 9.2.1.13 | |
| Trace Activation | O | 9.2.3.55 | |
| Masked IMEISV | O | 9.2.3.32 | |
| Location Reporting Information | O | 9.2.3.47 | Includes the necessary parameters for location reporting. |
| Criticality Diagnostics | O | 9.2.3.3 | |

*FIG. 9B*

| IE/Group Name | Presence | IE type/ref. | Semantics description |
|---|---|---|---|
| CHOICE *Cell Identifier* | M | | |
| >*NR* | | | |
| >>NR Cell Identity | M | BIT STRING (SIZE(36)) | The leftmost bits of the *NR Cell Identity* IE correspond to the gNB ID (defined in subclause 9.2.2.1). |
| >*E-UTRA* | | | |
| >>E-UTRA Cell Identity | M | BIT STRING (SIZE(28)) | The leftmost bits of the *E-UTRA Cell Identity* IE correspond to the ng-eNB ID (defined in subclause 9.2.2.8). |

*FIG. 9C*

| IE/Group Name | Presence | IE type/ref. | Semantics description |
|---|---|---|---|
| NG-RAN node UE XnAP ID | M | INTEGER (0 .. $2^{32}$-1) | |

*FIG. 9D*

| IE/Group Name | Presence | IE type/ref. | Semantics description |
|---|---|---|---|
| CHOICE *UE Context ID* | M | | |
| >*RRC Resume* | | | |
| >>I-RNTI | M | 9.2.3.46 | How the new NG-RAN node is able to resolve the old NG-RAN ID from the I-RNTI is a matter of proper configuration in the old and new NG-RAN node. |
| >*RRC Reestablishment* | | | |
| >>C-RNTI | M | BIT STRING (SIZE (16)) | C-RNTI contained in the *RRCReestablishmentRequest* message (TS 38.331 [10]) or *RRCConnectionReestablishmentRequest* message (TS 36.331 [14]). |
| >> Failure Cell PCI | M | NG-RAN Cell PCI 9.2.2.10 | |

*FIG. 9E*

| IE/Group Name | Presence | IE type/ref. | Semantics description |
|---|---|---|---|
| Message Type | M | 9.2.3.1 | |
| New NG-RAN node UE XnAP ID reference | M | NG-RAN node UE XnAP ID 9.2.3.16 | Allocated at the new NG-RAN node |
| Old M-NG-RAN node UE XnAP ID reference | M | NG-RAN node UE XnAP ID 9.2.3.16 | Allocated at the old M-NG-RAN node |
| Integrity protection | M | BIT STRING (SIZE (16)) | *ShortMAC-I* either contained in the *RRCConnection ResumeRequest* message or in the *RRCConnection ResumeRequest* message |
| New Cell Identifier | M | NG-RAN Cell Identity 9.2.2.9 | The Cell Identifier of the cell where the RRC connection has been requested to be resumed or to be re-established. |
| RRC Resume Cause | O | 9.2.3.61 | In case of RNA Update, contains the cause value provided by the UE in the *RRC ResumeRequest* message or in the *RRCConnection ResumeRequest* message, |

*FIG. 13*

INTER-RAT (RADIO ACCESS TECHNOLOGY) RE-ESTABLISHMENT ENHANCEMENTS IN MULTI-RAT DUAL CONNECTIVITY (MR-DC)

TECHNICAL FIELD

The present application relates generally to the field of wireless communication networks, and more specifically to devices, methods, and computer-readable media that facilitate simultaneous connectivity of a device or user equipment (UE) to multiple nodes in a radio access network (RAN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

In LTE, the Radio Resource Control (RRC) protocol is used to configure, setup, and maintain the radio connection between the user equipment (UE) and the base station, known as the evolved Node B (eNB). When the UE receives an RRC message from the eNB, it will apply the configuration (also referred to herein as "compile the configuration"), and if this succeeds the UE generates an RRC complete message that indicates the transaction ID of the message that triggered this response.

Since LTE Release 8, three Signaling Radio Bearers (SRBs), namely SRB0, SRB1 and SRB2 have been available for the transport of RRC and Non Access Stratum (NAS) messages between the UE and eNB. A new SRB, known as SRB1bis, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel. SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

A dual connectivity framework has been defined in LTE Release 12. Dual connectivity (or DC) refers to a mode of operation in which a UE, in RRC_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). More generally, they can be referred to as a master node (MN) and a secondary node (SN). DC can be viewed as a special case of carrier aggregation (CA), where the aggregated carriers, or cells, are provided by network nodes that are physically separated from one another and that are not connected to one another through a fast, quality, connection.

More specifically, in DC, the UE is configured with a Master Cell Group (MCG) and a Secondary Cell Group (SCG). A Cell Group (CG) is a group of serving cells associated with either the MeNB or the SeNB(s). MCG and SCG are defined as follows:

The Master Cell Group (MCG) is a group of serving cells associated with the MeNB, comprising a primary cell (PCell) and optionally one or more secondary cells (SCells).

A Secondary Cell Group (SCG) is a group of serving cells associated with the SeNB comprising a Primary SCell (pSCell) and optionally one or more SCells.

Put another way, a UE in DC maintains simultaneous connections to anchor and booster nodes, where the anchor node is also referred to as the MeNB and the booster nodes are also referred to as SeNBs. As its name implies, the MeNB terminates the control plane connection towards the UE and, as such, is the controlling node of the UE, including handovers to and from SeNBs. For example, the MeNB is the eNB that terminates at least the S1-MME connection, i.e., the connection between the eNB and the Mobility Management Entity (MME) for the UE. An SeNB is an eNB that is providing additional radio resources (e.g., bearers) for the UE but that is not the MeNB. Types of radio resource bearers include MCG bearers, SCG bearers, and split bearers.

RRC connection with the UE is handled only by the MeNB and, accordingly, SRBs (Signaling Radio Bearers) are always configured as MCG bearer type and therefore only use the radio resources of the MN. However, the MeNB can also configure the UE based on input from the SeNB and hence the SeNB can also indirectly control the UE. In an LTE-DC configuration, the MeNB is connected to the SeNBs via the Xn interface, which is currently selected to be the same as the X2 interface between the two eNBs.

According to LTE principles, UEs provide measurement reports—whether due to event trigger or a periodic trigger—comprising measurements of serving cell(s). For mobility measurements, MeNBs configure UEs according to various criteria including, e.g., frequency to measure, how to report, etc. Correspondingly, the UE sends measurement results to MeNB once the measurement criteria are met. When the UE needs to send a measurement report, whether event triggered or periodic triggered, the UE should always send measurement results of serving cell to network. For UE in LTE-DC, serving cell means both cells in MCG (MN) and cell in SCG (SN).

FIG. 1 illustrates various exemplary LTE DC scenarios involving UEs 110 and base stations (eNBs) 120. As shown, only one SeNB (at most) is connected to any of the illustrated UEs. However, more than one SeNB can serve a UE in general. Moreover, only one cell each from both MeNB and SeNB are shown to be serving the UE, however more than one cells can serve the UE in practice from both MeNB and SeNB. From the figure, it should also be clear that dual connectivity is a UE-specific feature and that a given network node (or a serving cell) can support a dual-connected UE and a legacy UE at the same time. In other words, MeNB and SeNB are roles played, or functions provided, by eNBs 120 for a given situation. Thus, while the eNBs 120 in FIG. 1 are labeled "MeNB" and "SeNB," this indicates only that they are playing this role for at least one UE 110. Indeed, a given eNB 120 may be an MeNB for one UE 110 while being an SeNB for another UE.

The master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE. Furthermore, in LTE, only inter-frequency DC is supported (i.e., the MCG and SCG must use different carrier frequencies).

In summary, LTE DC allows an LTE-capable UE to be connected to two nodes—MeNB and SeNB—to receive data from both nodes and thereby increase its data rate. The MeNB (or MN) provides system information, terminates the control plane, and can terminate the user plane. An SeNB (or SN), on the other hand, terminates only the user plane. This UP aggregation achieves benefits such as increasing the per user throughput for users that have good channel conditions and the capability of receiving and transmitting at higher data rates than can be supported by a single node, even without a low-latency backhaul/network connection between the MeNB and SeNB.

In 3GPP, a study item on a new radio interface for 5G has recently been completed and 3GPP is proceeding to standardize the new radio interface, often abbreviated by NR (New Radio). At a minimum, NR can be deployed independently without any interworking with LTE, a mode that can be referred to as NR stand-alone (SA) operation. In this mode, a NR base station (called "gNB") can be connected to a 5G core network (5GC), and an LTE eNB can be connected to an EPC with no interconnection between them.

FIG. 2 illustrates a high-level view of an exemplary 5G network architecture, consisting of a Next Generation RAN (NG-RAN) 299 and a 5G Core (5GC) 298. NG-RAN 299 can include one or more gNodeB's (gNBs) connected to the 5GC via one or more NG interfaces, such as gNBs 200, 250 connected via interfaces 202, 252, respectively. More specifically, gNBs 200, 250 can be connected to one or more Access and Mobility Management Functions (AMF) in the 5GC 298 via respective NG-C interfaces. Similarly, gNBs 200, 250 can be connected to one or more User Plane Functions (UPFs) in 5GC 298 via respective NG-U interfaces.

Although not shown, in some deployments 5GC 298 can be replaced by an Evolved Packet Core (EPC), which conventionally has been used together with LTE E-UTRAN. In such deployments, gNBs 200, 250 can connect to one or more Mobility Management Entities (MMEs) in EPC 298 via respective S1-C interfaces. Similarly, gNBs 200, 250 can connect to one or more Serving Gateways (SGWs) in EPC via respective NG-U interfaces.

In addition, the gNBs can be connected to each other via one or more Xn interfaces, such as Xn interface 240 between gNBs 200 and 250. The radio technology for the NG-RAN is often referred to as "New Radio" (NR). With respect the NR interface to UEs, each of the gNBs can support frequency division duplexing (FDD), time division duplexing (TDD), or a combination thereof.

NG-RAN 299 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 2 (and described in 3GPP TS 38.401 and 3GPP TR 38.801) include a Central Unit (CU or gNB-CU) and one or more Distributed Units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. A DU (e.g., gNB-DUs 220, 230) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 222 and 232 shown in FIG. 2. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:

F1 is an open interface;
  F1 supports the exchange of signaling information between respective endpoints, as well as data transmission to the respective endpoints;
  from a logical standpoint, F1 is a point-to-point interface between the endpoints (even in the absence of a physical direct connection between the endpoints);
  F1 supports control plane (CP) and user plane (UP) separation, such that a gNB-CU may be separated in CP and UP;
  F1 separates Radio Network Layer (RNL) and Transport Network Layer (TNL);
  F1 enables exchange of user equipment (UE) associated information and non-UE associated information;
  F1 is defined to be future proof with respect to new requirements, services, and functions;

A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of gNB-CU into a CU-CP function (including RRC and PDCP for signaling radio bearers) and CU-UP function (including PDCP for user plane). The CU-CP and CU-UP functions can communicate with each other using the E1-AP protocol over the E1 interface. In addition to the new E1 interface, the F1 interface can be logically separated into CP (F1-C) and UP (F1-U) functionalities. Furthermore, according to 3GPP TR 38.806, each of the CU-CP and CU-UP functions can be centralized or distributed independent of the other.

Returning to the above discussion about dual connectivity (DC), 3GPP TR 38.804 describes various exemplary DC scenarios or configurations where the MN and SN can apply either NR, LTE or both. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR;

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR.

MR-DC (multi-RAT DC): a generalization of the Intra-E-UTRA Dual Connectivity (DC) described in TS 36.300, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC, NE-DC, and NGEN-DC are different example cases of MR-DC.

Since deployment and/or migration for these options may differ for different operators, it is possible to have deployments with multiple options in parallel in the same network. In combination with LTE/NR DC solutions, it is also possible to support CA (Carrier Aggregation) in each cell group (i.e., MCG and SCG) and DC between nodes on same RAT (e.g., NR-NR DC). For the NR cells, a consequence of these different deployments is the co-existence of NR cells supporting SA only, NSA only, or both SA and NSA.

In NR or LTE, if a UE in RRC_CONNECTED detects radio link failure (RLF) on the master cell group (MCG) or declares a handover failure (reconfiguration with sync in NR, triggered upon the expiry of the timer T304), the UE selects a 'suitable cell' and initiates an RRC reestablishment. A "suitable cell" is defined in 3GPP TS 36.300 and 38.300 as one for which the measured cell attributes satisfy the cell selection criteria; the cell PLMN is the selected PLMN, registered or an equivalent PLMN; the cell is not barred or reserved and the cell is not part of a tracking area which is in the list of "forbidden tracking areas for roaming".

Although existing RRC re-establishment procedures are sufficient for single-connectivity operation in either LTE or NR, there are various problems related to performing re-establishment in dual-connectivity configuration, particularly with respect to multi-RAT NE-DC and NGEN-DC configurations.

SUMMARY

Exemplary embodiments disclosed herein address these and other problems, issues, and/or drawbacks of existing solutions by providing flexible and efficient techniques for a network to re-establish a target cell, of a second RAT, as a replacement for the UE's current primary cell (PCell) of a first RAT, when the UE is operating in MR-DC. Such embodiments improve both UE and network performance as compared to existing solutions, which require the UE to transition to RRC_IDLE mode and establish the connection from scratch for target cell of the second RAT.

Exemplary embodiments include various methods and/or procedures for a target node, in a radio access network (RAN), to establish a connection with a user equipment (UE) operating in dual connectivity (DC) with a master cell group (MCG) comprising a primary cell (PCell) served by a master node (MN) and with a secondary cell group (SCG) comprising a primary secondary cell (PSCell) served by a secondary node (SN).

The exemplary method and/or procedure can include receiving, from the UE, a re-establishment request message comprising a plurality of parameters associated with the PSCell, a message authentication code (MAC), and an indication of the UE's selection of a target cell served by the target node as a replacement for the PCell. The PCell can utilize a first radio access technology (RAT), while the PSCell and the target cell utilize a second RAT different from the first RAT. In some embodiments, one of the first RAT and the second RAT is New Radio (NR), and the other of the first RAT and the second RAT is Long-Term Evolution Evolved UTRA (LTE E-UTRA).

In some embodiments, the plurality of parameters associated with the PSCell can include an identifier of the PSCell and an identifier of the UE in relation to the PSCell. In some embodiments, the MAC included in the re-establishment request message can be based on a plurality of parameters associated with the PCell and on an identifier of the target cell. In some embodiments, the plurality of parameters associated with the PCell can include an identifier of the PCell, an identifier of the UE in relation to the PCell, and integrity protection information associated with the MN.

The exemplary method and/or procedure can also include, based on the plurality of parameters associated with the PSCell, determining a full UE context for the UE. The exemplary method and/or procedure can also include establishing a connection with the UE based on the full UE context, whereby the target cell served by the target node will serve as a PCell for DC.

Other exemplary embodiments include methods and/or procedures performed by a user equipment (UE) operating in dual connectivity (DC), in a radio access network (RAN), with a master cell group (MCG) comprising a primary cell (PCell) served by a master node (MN) and with a secondary cell group (SCG) comprising a primary secondary cell (PSCell) served by a secondary node (SN).

The exemplary method and/or procedure can include detecting a failure associated with the UE's current PCell, and selecting target cell served by a target node as a replacement for the PCell. The PCell can utilize a first radio access technology (RAT), while the PSCell and the target cell can utilize a second RAT different from the first RAT. In some embodiments, one of the first RAT and the second RAT is New Radio (NR), and the other of the first RAT and the second RAT is Long-Term Evolution Evolved UTRA (LTE E-UTRA).

The exemplary method and/or procedure can also include sending, to the target node, a re-establishment request message comprising a plurality of parameters associated with the PSCell, a message authentication code (MAC), and an indication of the UE's selection of the target cell as a replacement for the PCell. In some embodiments, the plurality of parameters associated with the PSCell can include an identifier of the PSCell, and an identifier of the UE in relation to the PSCell. In some embodiments, the exemplary method and/or procedure can also include calculating the MAC based on an identifier of the target cell and a plurality of parameters associated with the PCell.

In some embodiments, the plurality of parameters associated with the PCell can include an identifier of the PCell, an identifier of the UE in relation to the PCell, and integrity protection information associated with the MCG. In some embodiments, calculating the MAC can also be based on one of the following conversions: the identifier of the target cell into a format associated with the first RAT, or at least one of the parameters associated with the PCell into a format associated with the second RAT.

The exemplary method and/or procedure can also include establishing a connection with the target node, whereby the target cell served by the target node will serve as a PCell for DC.

Other exemplary embodiments include methods and/or procedures performed by a first node, in a radio access network (RAN), that is operating in dual connectivity (DC) toward a user equipment (UE) together with a second node in the RAN, according to various exemplary embodiments of the present disclosure. The exemplary method and/or procedure shown in FIG. 16 can be performed by a source node (e.g., MN, SN, MeNB, SeNB, MgNB, SgNB, etc. or components thereof) with respect to a particular UE.

The exemplary method and/or procedure can include receiving, from a target node in the RAN, a context request message pertaining to the UE. The context request message can include information identifying the UE in relation to the first node, a first message authentication code (MAC), and an identifier of a target cell, served by the target node, that was selected by the UE as replacement for the UE's current primary cell (PCell) that is part of a master cell group (MCG) served by a master node (MN). The UE's current primary secondary cell (PSCell) is part of a secondary cell group (SCG) served by a secondary node (SN). The PCell can utilize a first radio access technology (RAT), while the target cell and PSCell can utilize a second RAT different from the first RAT. In some embodiments, one of the first RAT and the second RAT is New Radio (NR), and the other of the first RAT and the second RAT is Long-Term Evolution Evolved UTRA (LTE E-UTRA).

The exemplary method and/or procedure can also include, based on the information identifying the UE in relation to the first node, providing the target node with a full UE context for the UE.

In some embodiments, the first node is the MN serving the PCell, the second node is the SN serving the PSCell, and the information identifying the UE comprises a first UE identifier in relation to the first node. In such embodiments, providing the target node with the full UE context can include retrieving the full UE context based on the first UE identifier, and sending, to the target node, a context response message including the full UE context. In some embodiments, sending the context response message can be based on determining that there is a match between the first MAC and a calculated second MAC.

In other embodiments, the second node is the MN serving the PCell, the first node is the SN serving the PSCell, and the information identifying the UE comprises a plurality of parameters associated with the PSCell. In such embodiments, providing the target node with the full UE context can include retrieving a UE context associated with the SN based on the plurality of parameters associated with the UE's current PSCell, and sending, to the MN, a request to provide the full UE context to the target node. In some embodiments, the UE context associated with the SN includes an identity of the UE in relation to the MN. In such embodiments, the identity of the UE in relation to the MN is included in the request to provide the full UE context to the target node.

Other exemplary embodiments include network nodes (e.g., base stations, eNBs, en-gNBs, etc., or components thereof) or user equipment (UEs, e.g., wireless devices, etc., or components thereof) configured to perform operations corresponding to the any of the exemplary methods and/or procedures described herein. Other exemplary embodiments include non-transitory, computer-readable media storing program instructions that, when executed by processing circuitry, configure such network nodes or UEs to perform operations corresponding to any of the exemplary methods and/or procedures described herein.

These and other objects, features and advantages of the exemplary embodiments of the present disclosure will become apparent upon reading the following Detailed Description in view of the Drawings briefly described below.

BRIEF DESCRIPTION OF THE DRAWINGS

FIGS. 6A-6C show exemplary ASN.1 data structures for an LTE RRCConnectionReestablishmentRequest message and various information elements (IEs) included therein.

FIGS. 8A-8C show exemplary ASN.1 data structures for an NR RRCReestablishmentRequest message and various IEs included therein.

FIGS. 9A-9E show structures of various other inter-node messages and IEs used during an NR RRC Reestablishment procedure.

FIG. 13 shows an exemplary RETRIEVE MN UE CONTEXT REQUEST message, according to various embodiments of the present disclosure.

DETAILED DESCRIPTION

Figure 1:
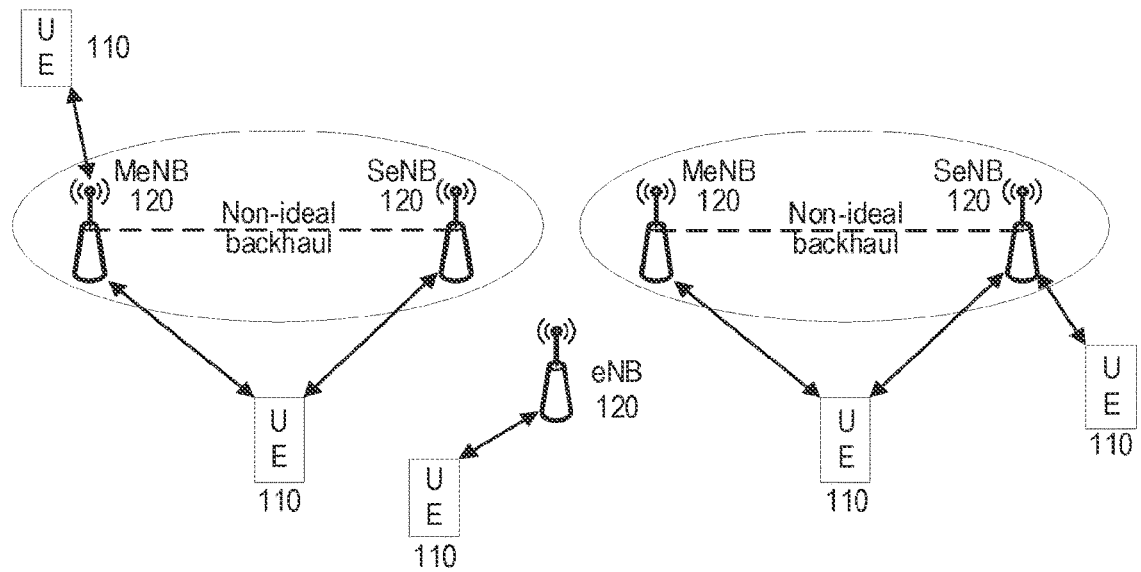
FIG. 1 is a high-level network diagram illustrating various exemplary Long-Term Evolution (LTE) dual connectivity (DC) scenarios involving user equipment (UEs) and evolved NodeBs (eNBs).
Figure 2:
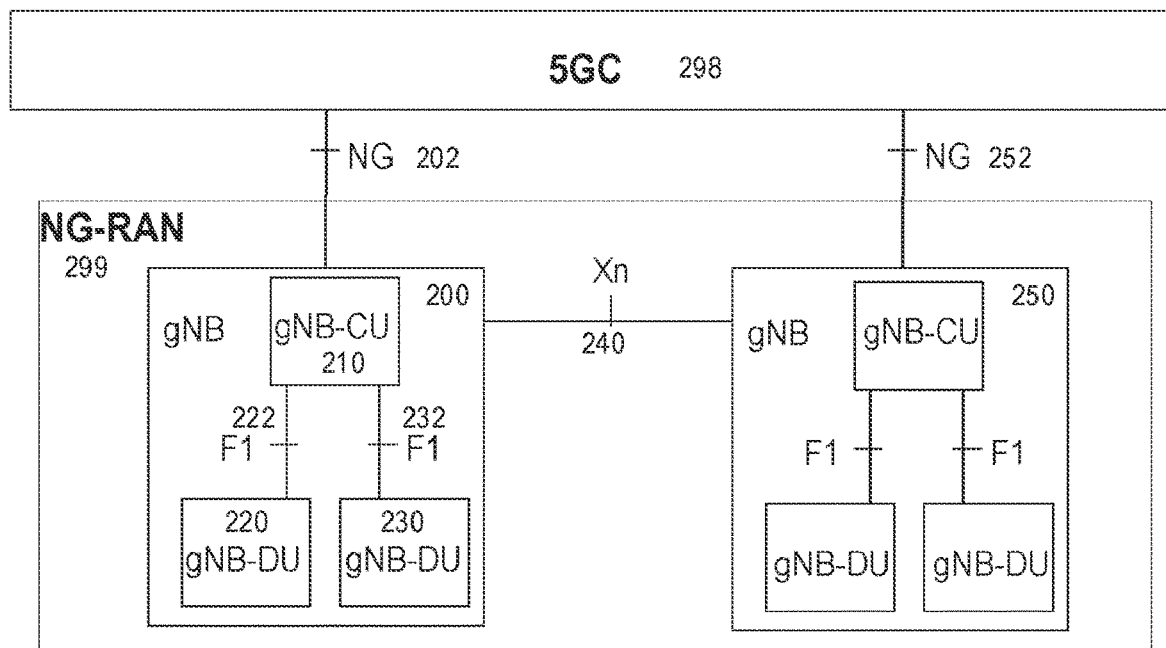
FIG. 2 illustrates a high-level view of an exemplary 5G network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

In the following, the terms eNB (eNodeB), gNB (gNodeB), MCG (Master Cell Group) and Primary Cell (PCell) may be used interchangeably to refer to the node or cell which the UE is connected to in single connectivity. Likewise, the terms SN (secondary node), SeNB (Secondary eNodeB), SgNB (Secondary gNodeB), SCG (Secondary Cell Group), and PSCell (Primary Secondary Cell) may be used interchangeably to refer to the secondary node or cell that the UE is connected to when the UE is configured with dual connectivity (DC).

In addition, the terms "source" and "last serving", as applied to nodes or cells (e.g., MeNB, MgNB, SeNB, SgNB, MCG, SCG, PCell, PSCell, etc.), can refer to the node or cell to which the UE was connected prior to a failure and an initiation of a reestablishment procedure. Similarly, the term target, as applied to nodes or cells (e.g., eNB, gNB, MCG, PCell, etc.) can refer to the node or cell in which the UE attempts to reestablish a connection. Furthermore, unless otherwise noted, the target (master) node/cell and the source secondary node/cell are intra-RAT and intra-system. In other words, they employ the same RAT and are connected to the same core network.

As mentioned above, although the currently-defined LTE and NR re-establishment procedures are sufficient for single-connectivity operation in either LTE or NR, there are various issues, drawbacks, and/or problems related to performing re-establishment in dual-connectivity configurations, particularly with respect to NE-DC and NGEN-DC configurations. These are discussed in more detail below.

Figure 3:
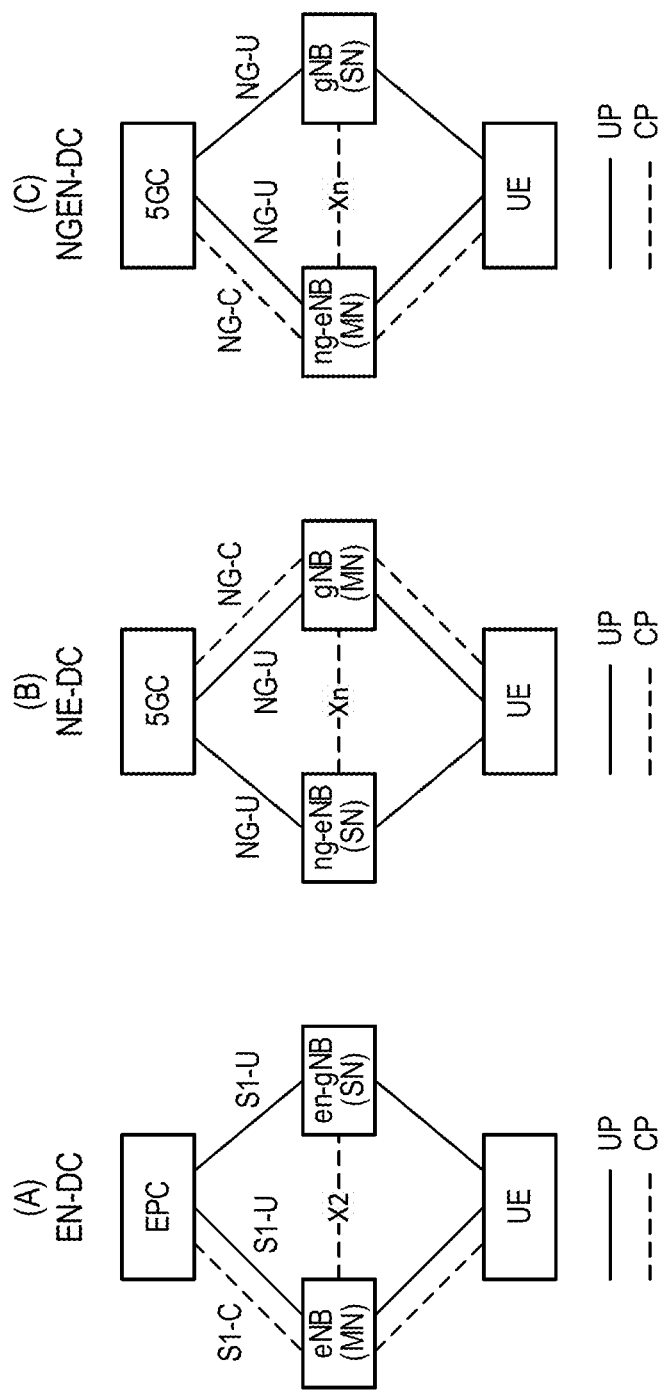
FIG. 3 is a block diagram showing a high-level comparison of the EN-DC, NE-DC, and NGEN-DC options.

FIG. 3 is a block diagram showing a high-level comparison of the EN-DC, NE-DC, and NGEN-DC options briefly mentioned above. In EN-DC (A), the NR en-gNB (SN) is operating in NSA mode and has no direct control-plane (CP) interface with the EPC. In NE-DC (B), the gNB MN has a direct interface with the 5GC while LTE SN's CP connection is via the MN (e.g., over the Xn interface). The NGEN-DC (C) scenario is similar to EN-DC (A), except that the ng-eNB CP connection is to 5GC via NG-C interface instead of to EPC via S1-C interface. Although not shown in FIG. 3, the NR-NR DC control plane is still undergoing standardization. As such, it is possible that it could resemble LTE DC (i.e., UE has only one RRC terminated at the MN) or EN-DC (i.e., UE has two RRC terminations, one at the MN and another at the SN).

Figure 4:
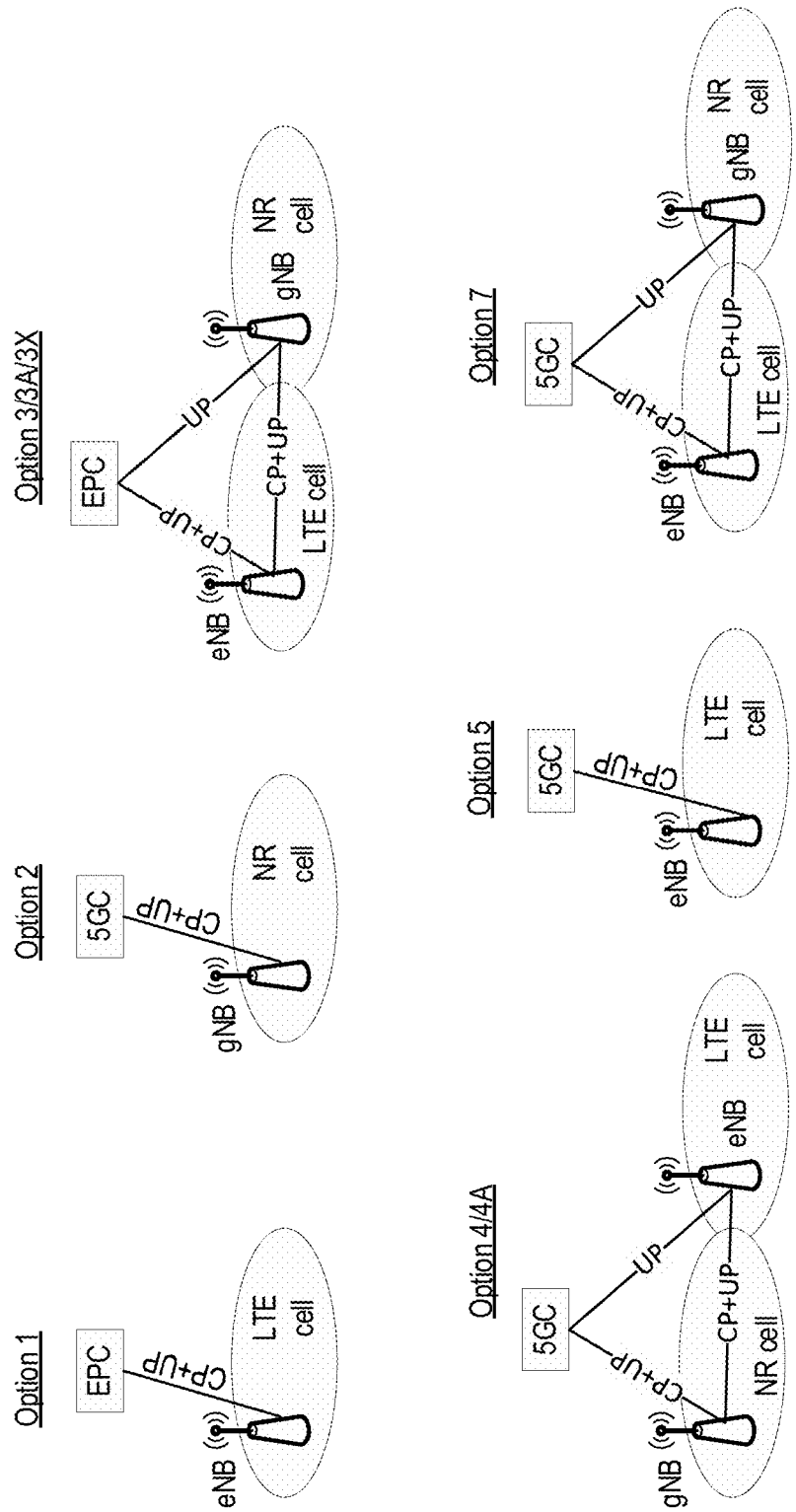
FIG. 4 shows various options for deploying a 5G network with or without interworking with existing LTE and Evolved Packet Core (EPC) networks, according to current 3GPP standards.

FIG. 4 illustrates various options for deploying a 5G network with or without interworking with existing LTE and EPC, according to current 3GPP standards. Option 1 depicts the legacy LTE standalone (SA) deployment where LTE eNBs are connected to an EPC. Option 2 depicts NR SA deployment where the NR gNBs are connected to a 5GC. Option 3/3A/3X depicts EN-DC, described above. Option 4/4A depicts NE-DC, described above. Option 5 depicts a hybrid solution where enhanced LTE (eLTE) eNBs (e.g., ng-eNBs) are connected to a 5GC. Finally, option 7/7A depicts NGEN-DC, described above.

In NR or LTE, if a UE in RRC_CONNECTED detects radio link failure (RLF) on the master cell group (MCG) or declares a handover failure (reconfiguration with sync in NR, triggered upon the expiry of the timer T304), the UE selects a "suitable cell" and initiates an RRC reestablishment. A "suitable cell" is defined in 3GPP TS 36.300 and 38.300 as one for which the measured cell attributes satisfy the following cell selection criteria: the cell PLMN is the selected PLMN, registered or an equivalent PLMN; the cell is not barred or reserved; and the cell is not part of a tracking area in the list of "forbidden tracking areas for roaming."

If the UE selects a cell belonging to the same RAT and system that it was connected to prior to the failure (e.g., NR to NR, LTE/EPC to LTE/EPC, or LTE/5GC to LTE/5GC), the UE stops timer T311 (if triggered by radio link failure (RLF)) and initiates the re-establishment procedure by starting the timer T301 and transmitting the re-establishment request. However, if the UE selects an inter-RAT cell (e.g., NR to LTE/EPC or LTE/5GC, and LTE/EPC or LTE/5GC to NR), the UE will transition to RRC_IDLE and perform NAS signalling, which is less optimized than re-establishment signalling. So, if the UE is in RRC_CONNECTED in NR it will enter RRC_IDLE and upper layers may trigger a new connection. The same occurs if the UE reselects an intra-RAT/inter-system cell, e.g., the UE was connected to an LTE/EPC cell and reselects to an LTE/5GC cell, or the UE was connected to an LTE/5GC cell and reselects to an LTE/EPC cell.

The procedures to trigger the reestablishment are specified in § 5.3.7.3 of 3GPP TS 36.331 v15.3.0 (LTE) and 3GPP TS 38.331 v15.3.0 (NR). The procedures to prepare the RRCConnectionReestablishmentRequest (LTE) and the RRCReestablishmentRequest (NR) messages are specified in § 5.3.7.4 of 36.331 and 38.331, respectively. In both RRCConnectionReestablishmentRequest and RRCReestablishmentRequest messages, the UE includes a ue-Identity that enables the network to identify the UE AS Context and properly continue the re-establishment procedure by sending an RRCConnectionReestablishment or RRCReestablishment message with a Next Hop Chaining Count (NCC) for security key refresh, and an RRCConnectionReconfiguration or RRCReconfiguration message to resume signalling radio bearer 2 (SRB2) and data radio bearers (DRBs). For NR, at least, the RRCReconfiguration message can be multiplexed with the RRCReestablishment due to the fact that it is sent on integrity protected SRB1. The following discusses how the procedures and messages are defined in 3GPP TS 36.331 v15.3.0 (LTE) and 3GPP TS 38.331 v15.3.0 (NR).

Figure 5:
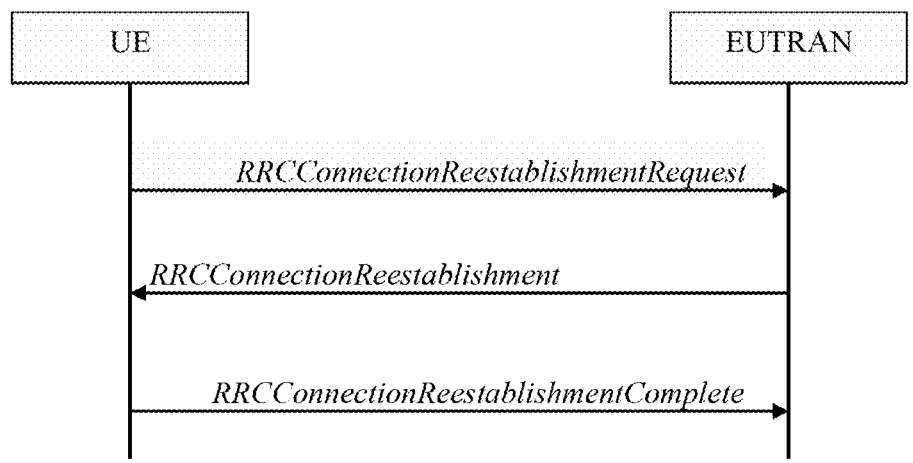
FIG. 5 is a signaling flow diagram for a successful LTE radio resource control (RRC) connection re-establishment procedure.

In LTE, the UE initiates RRC Connection Reestablishment under any of the following conditions:
  upon T310 expiry (detection of physical layer problems for the PCell); or
  upon T312 expiry (Measurement reporting has failed); or
  upon random access problem indication from MCG MAC; or
  upon indication from MCG RLC, which is allowed to be send on PCell, that the maximum number of retransmissions has been reached for an SRB or DRB:

FIG. 5 shows a signal flow diagram for a successful RRC Connection Reestablishment procedure in LTE. When the UE initiates the procedure, it performs cell selection and then transmits the RRCReestablishmentRequest message. However, if the UE reselects to an inter-RAT cell it will go to RRC_IDLE and perform NAS recovery.

As briefly mentioned above, details of the RRC Reestablishment procedures in LTE are specified in 3GPP TS 36.331 (v15.3.0) sections 5.3.7.3 and 5.3.7.4. Portions of these sections most relevant to the present disclosure are given below:
*Begin 3GPP TS 36.331 Excerpt*
5.3.7.3 Actions Following Cell Selection while T311 is Running
. . .
Upon selecting an inter-RAT cell, the UE shall:
  1> if the selected cell is a UTRA cell, and if the UE supports Radio Link Failure Report for Inter-RAT MRO, include selectedUTRA-CellId in the VarRLF-Report and set it to the physical cell identity and carrier frequency of the selected UTRA cell;
  1> perform the actions upon leaving RRC_CONNECTED as specified in 5.3.12, with release cause 'RRC connection failure';
5.3.7.4 Actions Related to Transmission of RRCConnectionReestablishmentRequest
. . .
The UE shall set the contents of RRCConnectionReestablishmentRequest message as follows:
  1> except for a NB-IoT UE for which AS security has not been activated, set the ue-Identity as follows:
    2> set the c-RNTI to the C-RNTI used in the source PCell (handover and mobility from E-UTRA failure)

or used in the PCell in which the trigger for the re-establishment occurred (other cases);

2> set the physCellId to the physical cell identity of the source PCell (handover and mobility from E-UTRA failure) or of the PCell in which the trigger for the re-establishment occurred (other cases);

. . .

*End 3GPP TS 36.331 Excerpt*

FIG. 6A shows an ASN.1 data structure for an LTE RRCConnectionReestablishmentRequest message, as in 3GPP TS 36.331 (v15.3.0). Various fields of this message are defined as follows:

physCellId: Physical Cell Identity of the PCell the UE was connected to prior to the failure.

reestablishmentCause: Indicates the failure cause that triggered the re-establishment procedure. eNB is not expected to reject a RRCConnectionReestablishmentRequest due to unknown cause value being used by the UE.

ue-Identity: UE identity included to retrieve UE context and to facilitate contention resolution by lower layers.

In addition, FIG. 6B shows an ASN.1 data structure for C-RNTI, which identifies a UE having an RRC connection within a cell. The field "c-RNTI" in the message shown in FIG. 6A is an instance of the data structure shown in FIG. 6B. Likewise, FIG. 6C shows an ASN.1 data structure for PhysCellID, which is used to indicate the physical layer identity of the cell. The field "physCellId" in the message shown in FIG. 6A is an instance of the data structure shown in FIG. 6C.

In NR, a UE initiates an RRC Reestablishment procedure upon any of the following:

detecting radio link failure of the MCG due to one of the following: expiry of timer T310 in PCell, random access problem indication from MCG MAC, or indication from MCG RLC that maximum retransmissions has been reached.

re-configuration with sync failure of the MCG;

mobility from NR failure;

integrity check failure indication from lower layers for SRB1 or SRB2; or

RRC connection reconfiguration failure, in accordance with sub-clause 5.3.5.8.2.

Figure 7A:
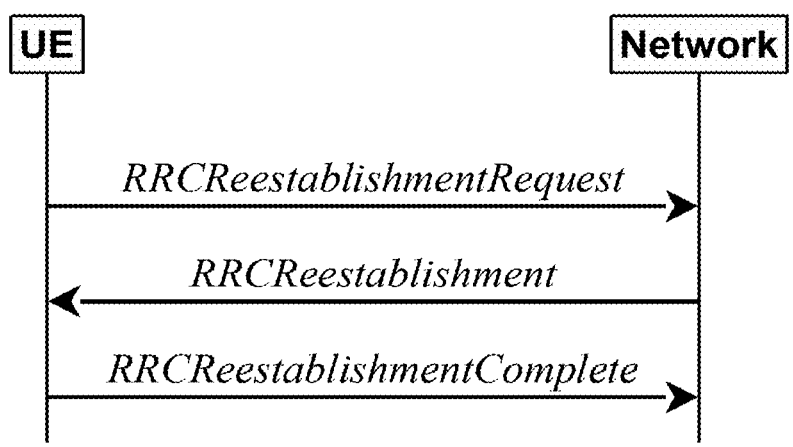
FIGS. 7A-7B show signaling flow diagrams for various NR RRC Reestablishment procedures.
Figure 7B:
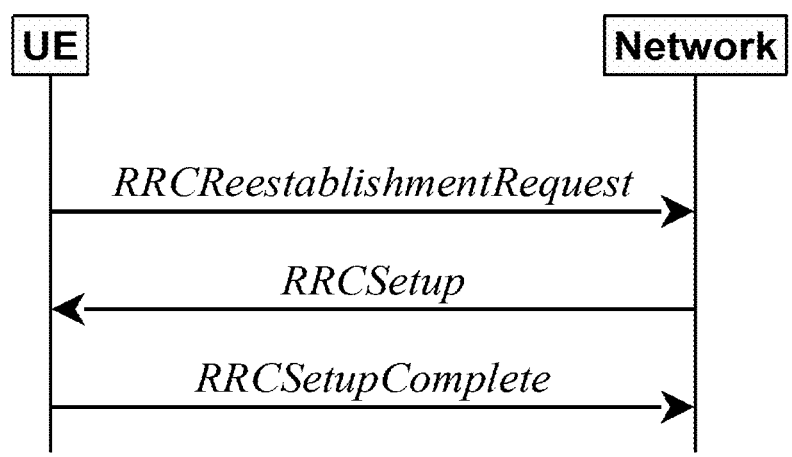

FIG. 7A shows a signal flow diagram for a successful RRC Reestablishment procedure in NR. When the UE initiates the procedure, it performs cell selection and then transmits the RRCReestablishmentRequest message. However, if the UE reselects to an inter-RAT cell it will go to RRC_IDLE and perform NAS recovery. In addition, if the network fails to retrieve the UE context, the network can respond to the RRCReestablishmentRequest message with a RRCSetup message, which will establish a new RRC connection. FIG. 7B shows a signal flow diagram for an RRC Reestablishment procedure in NR resulting in fallback to RRC establishment, which is ultimately successful.

As briefly mentioned above, details of the RRC Reestablishment procedures in NR are specified in 3GPP TS 38.331 (v15.3.0) sections 5.3.7.3 and 5.3.7.4. Portions of these sections most relevant to the present disclosure are given below:

*Begin 3GPP TS 38.331 Excerpt*

5.3.7.3 Actions Following Cell Selection while T311 is Running

. . .

Upon selecting an inter-RAT cell, the UE shall:

1> perform the actions upon going to RRC_IDLE as specified in 5.3.11, with release cause 'RRC connection failure';

. . .

5.3.7.4 Actions Related to Transmission of RRCReestablishmentRequest Message

The UE shall set the contents of RRCReestablishmentRequest message as follows:

1> set the ue-Identity as follows:
2> set the c-RNTI to the C-RNTI used in the source PCell (reconfiguration with sync or mobility from NR failure) or used in the PCell in which the trigger for the re-establishment occurred (other cases);
2> set the physCellId to the physical cell identity of the source PCell (reconfiguration with sync or mobility from NR failure) or of the PCell in which the trigger for the re-establishment occurred (other cases);
2> set the shortMAC-I to the 16 least significant bits of the MAC-I calculated:
3> over the ASN.1 encoded as per section 8 (i.e., a multiple of 8 bits) VarShortMAC-Input;
3> with the $K_{RRCint}$ key and integrity protection algorithm that was used in the source PCell (reconfiguration with sync or mobility from NR failure) or of the PCell in which the trigger for the re-establishment occurred (other cases); and
3> with all input bits for COUNT, BEARER and DIRECTION set to binary ones;
2> if the re-establishment procedure was initiated due to reconfiguration failure as specified in 5.3.5.8:
3> set the reestablishmentCause to the value reconfigurationFailure;
2> else if the re-establishment procedure was initiated due to reconfiguration with sync failure as specified in 5.3.5.8.3 (intra-NR handover failure) or 5.4.3.5 (inter-RAT mobility from NR failure):
3> set the reestablishmentCause to the value handoverFailure;
2> else:
3> set the reestablishmentCause to the value otherFailure;
1> restore the RRC configuration and security context from the stored UE AS context;
1> restore the PDCP state and re-establish PDCP for SRB1;
1> re-establish RLC for SRB1;
1> resume SRB1;
1> The UE shall submit the RRCReestablishmentRequest message to lower layers for transmission.

*End 3GPP TS 38.331 Excerpt*

The UE could also receive an RRCSetup message in response to an RRCRestablishmentRequest it has sent (e.g., when the gNB is not able to find the UE context). In this case, the UE performs the RRC connection establishment procedure as specified in 5.3.3.4.

FIG. 8A shows an ASN.1 data structure for an NR RRCReestablishmentRequest message, as in 3GPP TS 38.331 (v15.3.0). Various fields of this message are defined as follows:

physCellId: Physical Cell Identity of the PCell the UE was connected to prior to the failure.

reestablishmentCause: Indicates the failure cause that triggered the re-establishment procedure. The gNB is not expected to reject a RRCReestablishmentRequest due to unknown cause value being used by the UE.

ue-Identity: UE identity included to retrieve UE context and to facilitate contention resolution by lower layers.

In addition, FIG. 8B shows an ASN.1 data structure for RNTI-Value, which identifies a UE having an RRC connection within a cell. The field "c-RNTI" in the message shown in FIG. 8A is an instance of the data structure shown in FIG. 8B. Likewise, FIG. 8C shows an ASN.1 data structure for PhysCellID, which is used to indicate the physical layer identity of the cell. The field "physCellId" in the message shown in FIG. 8A is an instance of the data structure shown in FIG. 8C.

Various other inter-node messages used during the RRC Reestablishment procedure in NR. These are defined in 3GPP TS 38.423 (v15.0.0) and include:

RETRIEVE UE CONTEXT REQUEST—sent by the new NG-RAN node to request the old NG-RAN node to transfer the UE Context to the new NG-RAN. FIG. 9A shows an exemplary structure of this message.

RETRIEVE UE CONTEXT RESPONSE—sent by the old NG-RAN node to transfer the UE context to the new NG-RAN node. FIG. 9B shows an exemplary structure of this message.

NG-RAN Cell Identity—IE that contains either an NR or an E-UTRA Cell Identity. FIG. 9C shows an exemplary structure of this IE.

NG-RAN node UE XnAP ID—The NG-RAN node UE XnAP ID uniquely identifies a UE over the Xn interface within the NG-RAN node. FIG. 9D shows an exemplary structure of this IE.

UE Context ID—IE used to address a UE Context within an NG-RAN node. FIG. 9E shows an exemplary structure of this IE.

For example, if a UE is configured with NE-DC or NGEN-DC and experiences failure (e.g., radio link failure (RLF), handover failure, integrity verification failure of SRB1/2, etc.) in the MN, it performs cell selection. If the UE selects a node in the same RAT and system as the MN, the UE initiates RRC Reestablishment. However, if the UE selects an inter-RAT and/or inter-system cell, it will go to RRC_IDLE state in the target RAT. This requires the UE to trigger an RRC Connection Setup procedure in the target RART to establish the connection from scratch, which can take a relatively longer time and consume relatively more network resources as compared to reestablishment.

Exemplary embodiments disclosed herein address these and other problems, issues, and/or drawbacks of existing DC solutions by allowing a UE operating in MR-DC (e.g., NE-DC or NGEN-DC) to perform re-establishment even towards an inter-RAT cell, thereby improving both UE and network performance as compared to going to RRC_IDLE state and establishing the connection from scratch in that inter-RAT cell. Furthermore, these exemplary embodiments address additional problems that do not exist in inter-RAT re-establishment for single-connectivity (i.e., non-DC) operation, including but not limited to handling of an AS context associated with the MN and/or SN, identification of the UE AS context, and calculation of a security token.

When a UE operating in MR-DC declares failure of its current PCell (of a first RAT) and initiates an inter-RAT RRC Reestablishment towards a selected target cell of a second RAT, the UE can include the physical cell ID (PCI) of its current PSCell and the UE's C-RNTI with respect to the current PSCell in the reestablishment request message. Like the selected target cell, the current PSCell is of the second RAT. If the UE can reestablish in the selected target cell, the source PCI and C-RNTI can be assigned by the source MN serving the current PCell of the first RAT, rather than by the source SN serving the current PSCell of the second RAT.

Accordingly, one particular advantage provided by the exemplary embodiments is that a UE in inter-RAT MR-DC (e.g., NE-DC or NGEN-DC) can reuse parameters associated with its SN/PSCell/SCG to reestablish a connection with a target PCell (of the same RAT as the SN) after a failure in its current PCell (of a different RAT than the target PCell). This not only reduces interruption time but also can enable inter-RAT reestablishment without the need to modify the RRC messages used to transmit parameters from different RATs with different formats.

Upon initiating the inter-RAT RRC Reestablishment procedure, the UE can perform various operations including handling (e.g., storing) the AS context associated with the MN and the SN, computing a security token (e.g., MAC-I), and setting the AS context identifier according to various rules and criteria discussed in more detail below. In addition, the UE can include identifiers of the physical cell ID (PCI) and the C-RNTI associated with the source PSCell in the reestablishment request message (e.g., RRCConnectionReesestablishmentRequest or RRCReestablishmentRequest). Note that the included source PCI and C-RNTI have been assigned by a different RAT than the RAT of the target cell in which the UE is reestablishing the connection. Upon receiving one or more responsive messages (e.g., re-establishment and/or reconfiguration messages) from a network node serving the target cell, the UE can complete the connection re-establishment with the target cell.

In some embodiments, when a UE operating in MR-DC reselects to an inter-RAT cell in the same RAT as the last serving SN, the UE calculates a short MAC-I to be included in the reestablishment request message (e.g., RRCConnectionReesestablishmentRequest or RRCReestablishmentRequest) using the security parameters associated with the MCG, the PCI of the PCell, the C-RNTI that was allocated by the MN, and the target cell ID. Since the PCI and C-RNTI are in a different format than the target Cell ID, various procedures can be applied. Even so, the UE can include PCI and C-RNTI allocated by the SN in the reestablishment request message, rather than PCI and C-RNTI allocated by the source MN.

In some embodiments, when the (inter-RAT) target node receives the reestablishment request message containing these parameters, the PCI included in the Reestablishment UE identity is used to locate the source SN (e.g. via automatic neighbor relations, ANR) that has the stored UE SN context. The target node then sends a UE context retrieve request to this source SN. This is legacy behavior.

Upon receiving this request, the source SN retrieves the UE SN context (using the C-RNTI included in the message), and from it determines a reference to the source MN and the UE identity used by the MN (e.g., an XnAP Identity). Rather than verifying this UE identity, as in existing or legacy solutions, the source SN instead forwards the request along with the UE identity used by the MN (e.g., the short MAC-I and the target cell ID that was sent by the UE in the RRC Reestablishment Request message) to the source MN.

Furthermore, upon receiving this forwarded request, the source MN uses this identity (e.g., an XnAP identity) to locate the UE context that it has stored. Using the information in this stored UE context (e.g., security keys/algorithms, source MN C-RNTI, PCell PCI) as well as the target cell ID that was sent by the UE, the MN can calculate an XMAC-I and compare it with short MAC-I sent by the UE. If there is a match, the MN locates the target node using the target cell ID (e.g., using ANR) and then sends the full UE context to the target node. The target node can then send the RRC re-establishment message to the UE.

In this manner, a UE connected in inter-RAT MR-DC (e.g., NE-DC or NGEN-DC) can reuse parameters of the SN when reestablishing a connection after a failure instead of going to RRC_IDLE, which will reduce the interruption time. Moreover, these novel techniques facilitate inter-RAT reestablishment by the use of existing RRC messages—without modification—for transmitting parameters from different RATs with different formats.

In some embodiments where the UE attempts re-establishment while operating in NE-DC (i.e., NR source MN, E-UTRA source SN, E-UTRA target node), the target cell ID is the E-UTRA Cell ID as defined in 3GPP TS 36.331 (v15.3.0) section 9.2.2.9. In other embodiments where the UE attempts re-establishment while operating in NGEN-DC (i.e., E-UTRA source MN, NR source SN, NR target node), the target cell ID is the NR Cell ID as defined in 3GPP TS 38.331 section 9.2.2.9. Although both of these embodiments involve MR-DC with both RATs connected to a 5GC, similar procedures can be applied in other embodiments where both RATs are connected to an EPC or, more generally, in any other inter-RAT DC scenario.

In general, the described embodiments include a UE reestablishing in only a single connectivity. Nevertheless, other embodiments include the situation where the UE establishes a secondary connection (e.g., with a SN) in the RRC Reestablishment procedure. In such case, the disclosed procedures would still apply but with an additional configuration of the SN during such reestablishment.

As mentioned above, a UE connected in MR-DC with the MN in a first RAT and the SN in a second RAT (e.g., NGEN-DC or NE-DC) will trigger a re-establishment procedure when the UE experiences a failure in the MCG. Such failures can include a radio link failure, a failure during handover, integrity verification check failure on SRB1/2, etc. The first step of the reestablishment procedure is for the UE to perform configured measurements on various cells, and then reselect the best cell based on the configured measurements. This target cell can be any measured cell, including the same cell in which the UE experienced the failure.

If the target cell belongs to the same RAT as the source PCell of the MN, the UE performs a normal reestablishment procedure, and if the target cell belongs to a different node than the source PCell, the UE context may be transferred to this different node, e.g., over an X2 or Xn interface. On the other hand, if the target cell belongs to a different RAT than the source PCell of the MN, conventionally the UE will go to RRC_IDLE and possibly perform NAS recovery. However, if the target RAT is the same as the one of the PSCell in the SN, the UE is already known within that RAT.

The identity that the UE uses when requesting an RRC reestablishment consists of the UE's source cell C-RNTI and the source cell PCI. As shown in FIGS. 6B-C (LTE) and 8B-C (NR), each of these parameters is expressed in different formats between LTE and NR, such that parameters for one RAT are not recognizable by the other RAT. Even so, since the UE is known by the second RAT in the SN where the UE has been assigned a C-RNTI for the PSCell and has obtained the PCI of the PSCell, UE can use these PSCell parameters during inter-RAT reestablishment in NE-DC or NGEN-DC according to various embodiments described in more detail below.

As mentioned above, in some embodiments, the verification of the UE identity can be performed by the source MN. Since the source MN belongs to a different RAT than the target RAT (i.e., source MN is NR while target node is E-UTRA), the source PCI and C-RNTI will be in a different format than the target cell parameters. In order to calculate the shortMAC-I, either the source parameters or target parameters need to be adopted to the format of the other in order to use existing procedures to calculate the short MAC-I. Alternately, other procedures can be introduced to utilize parameters of different RATs directly in the calculations of the short MAC-I. Exemplary embodiments of such other procedures are disclosed in U.S. Prov. Appl. 62/735,872, which is incorporated herein by reference in its entirety.

Figure 10:
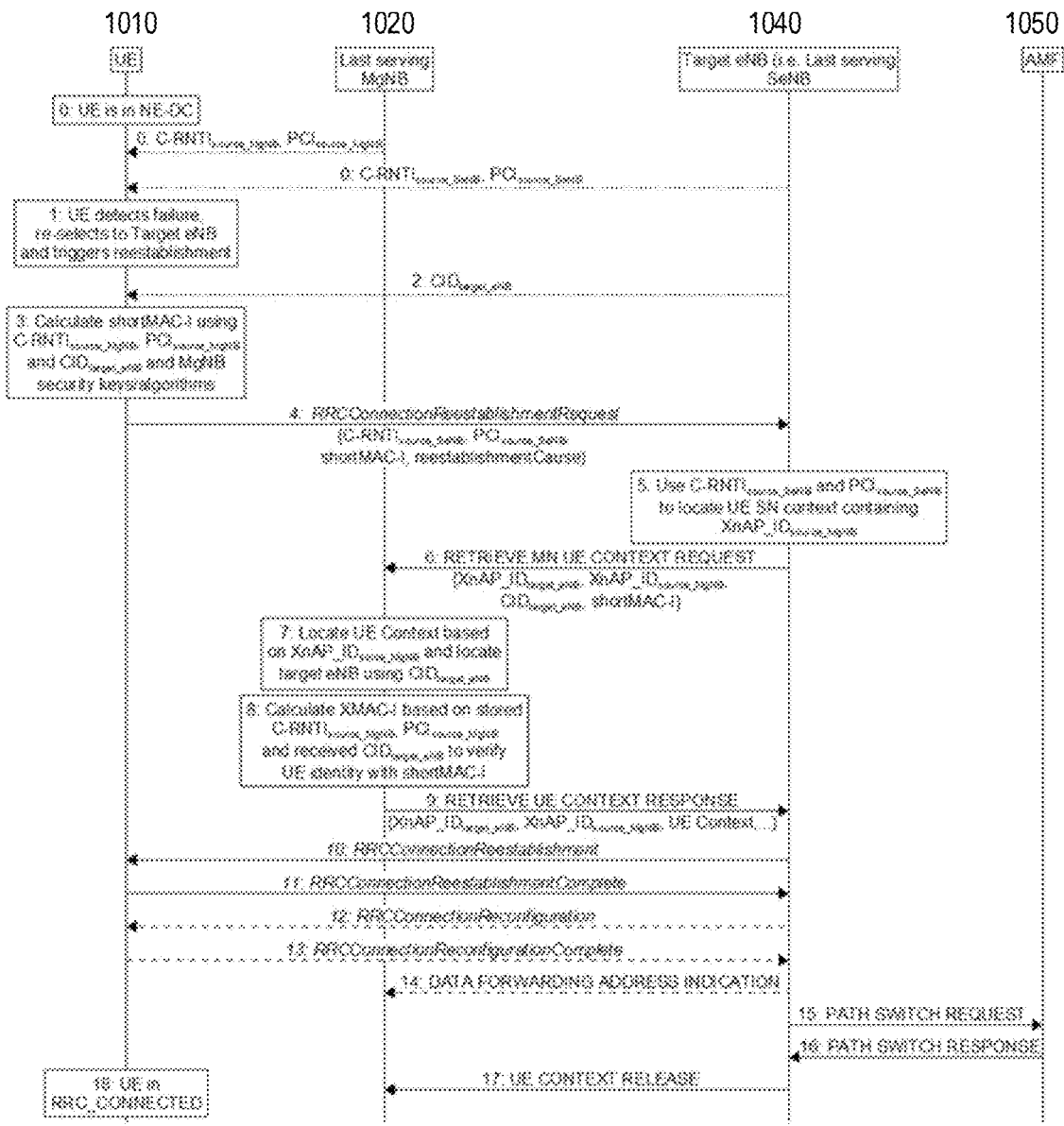
FIG. 10 shows a signal flow diagram for inter-RAT reestablishment from NE-DC operation, where the target MN is the source SN, according to various exemplary embodiments of the present disclosure.

FIG. 10 shows an exemplary signaling diagram for an inter-RAT reestablishment during NE-DC operation where the source SN (e.g., SeNB) is the target node, according to certain exemplary embodiments. This scenario involves a UE 1010, a current serving MgNB 1020 (providing the UE's current PCell), and a current serving SeNB 1040 (providing the UE's current PSCell), which is also the target node providing a target cell selected by the UE as a replacement for the current PCell, as explained in more detail below. Although the operations shown in FIG. 10 are given numerical labels, these labels are for the purpose of explanation and do not limit the operations to occur in a particular order.

In operation 0, the UE is in NE-DC. Since it is in RRC_CONNECTED, it has received C-RNTIs from the both the MgNB and SeNB, and is also aware of the PCIs of the PCell (MgNB) and PSCell (SeNB). In operation 1, the UE detects failure whereupon it reselects to a cell belonging to the source eNB and triggers re-establishment. In operation 2, the UE obtains the E-UTRA Cell identity from the target cell (e.g., from SIB1).

In operation 3, the UE calculates the security token (e.g., short MAC-I) using the key (e.g., KgNB) and integrity protection algorithms associated with the MN. The UE also uses the VarShortMAC-I according to the MN format (i.e., the NR VarShortMAC-I) with the PCI and C-RNTI of the source MN. Since it is an E-UTRA cell, the target cell PCI will be in a different format so the UE converts the format of the source parameters or the target parameters to use existing procedures, or utilizes the other procedures discussed above to calculate the security token with parameters from different RATs.

In operation 4, the UE sends a RRCConnectionReestablishmentRequest message. When sending this message, although the shortMAC-I was calculated based on the MgNB parameters and the target PCI in operation 3, the UE includes the SeNB parameters (i.e., C-RNTI_SeNB and PCI_SeNB) in the message. In contrast, in existing or legacy re-establishment procedures, the UE includes the C-RNTI and PCI associated with the NR PCell.

In operation 5, when the target eNB (i.e., source SN) receives the RRCConnectionReestablishmentRequest message, even if the included PCI is associated with one of the cells of the target eNB, the target eNB will use the included C-RNTI to determine that the UE was connected to the target eNB in DC and that the target eNB was the SN. Instead of trying to verify the UE identity, as in legacy re-establishment procedures, it will determine the source MN identity and the XnAP ID that was used by the source MN to identify that UE. In operation 6, the target eNB sends a RETRIEVE MN UE CONTEXT REQUEST message to the source MN. This message contains the XnAP ID that was used by the source MN to identify the UE, the XnAP ID that is used by the source SN to identify the UE, the short MAC-I, and the target cell PCI. In various embodiments, this message sent in operation 6 can be a modified version of the UE context retrieve request or a new message.

In operation 7, after receiving the UE context retrieve message, the source MN (i.e., last serving MgNB) locates the UE context based on source MN's UE XnAP ID that was included in the message sent in operation 6. Since 3GPP TS 38.423 (v15.0.0) requires that "The NG-RAN node UE XnAP ID shall be unique within the logical NG-RAN node", the source MN is able to uniquely identity the UE based on UE XnAP ID provided in the context request. Unlike existing and/or legacy procedures, the source MN will not perform integrity verification but instead responds in operation 9 by sending the UE context. For example, this message sent in operation 9 can be an existing RETRIEVE UE CONTEXT RESPONSE message. Note that in some cases, after operation 9, the source SN may need to consider the latest SCG configurations (e.g., if SRB3 was configured) and the source MN may not have the latest configurations. The configurations can be added to the configurations sent by the source MN in operation 9.

Prior to responding in operation 9, in operation 8, the source MN retrieves the stored values for the source PCell PCI and C-RNTI based on based on the XnAP ID provided by the retrieve request. The source MN then uses these values along with the received target Cell PCI to calculate the XMAC-I based on the security key (KgNB) and integrity protection algorithms associated with the MN. To calculate the XMAC-I in this manner, the source MN uses procedures that accommodate parameters from different RATs (since PCI and C-RNTI are in NR format while target Cell Id is in E-UTRA format), as in operation 3.

In operation 10, the target eNB transmits a RRCConnectionReestablishment message to the UE. This is used to set up SRB1. In operation 11, The UE transmits RRCConnectionReestablishmentComplete message to the target eNB. In operation 12, the target eNB sends an RRCConnectionReconfiguration message to setup SRB2 and DRBs. In operation 13, the UE responds to the target eNB with a RRConnectionReconfigurationCompletemessage.

With respect to operations 10-13, currently the existing LTE RRCConnectionReestablishment message is sent over SRB0. In NR, the existing RRCReestablishment message is sent via SRB1. So similar enhancements can be envisioned where SRB1 can be used for sending the LTE RRCConnectionReestablishment message. In that case, the RRCConnectionReconfiguration can be multiplexed with the RRCConnectionReestablishment message, such that the target eNB doesn't have to wait for the RRCConnectionReestablishmentComplete message before sending the RRCConnectionReeconfiguration message. In some embodiments, the LTE RRCConnectionReestablishment message can be modified to include IEs needed for reconfiguring SRB2 and DRBs. In contrast, legacy reestablishment is used to reconfigure only SRB1 and an additional RRCConnectionReconfiguration message is required to setup SRB2 and DRBs.

In operation 14, the last serving gNB provides forwarding addresses to prevent loss of DL user data buffered in the this gNB. In operations 15-16, the CN path is switched to the target eNB. In operation 17, the target eNB triggers the release of the UE resources at the last serving MgNB. In addition, the target eNB could release the resources associated with the UE, such as resources that were used at the target eNB for holding the information associated with the UE while connected in DC before the re-establishment request was received. In operation 18, the UE resumes operation in RRC_CONNECTED mode.

Figure 11:
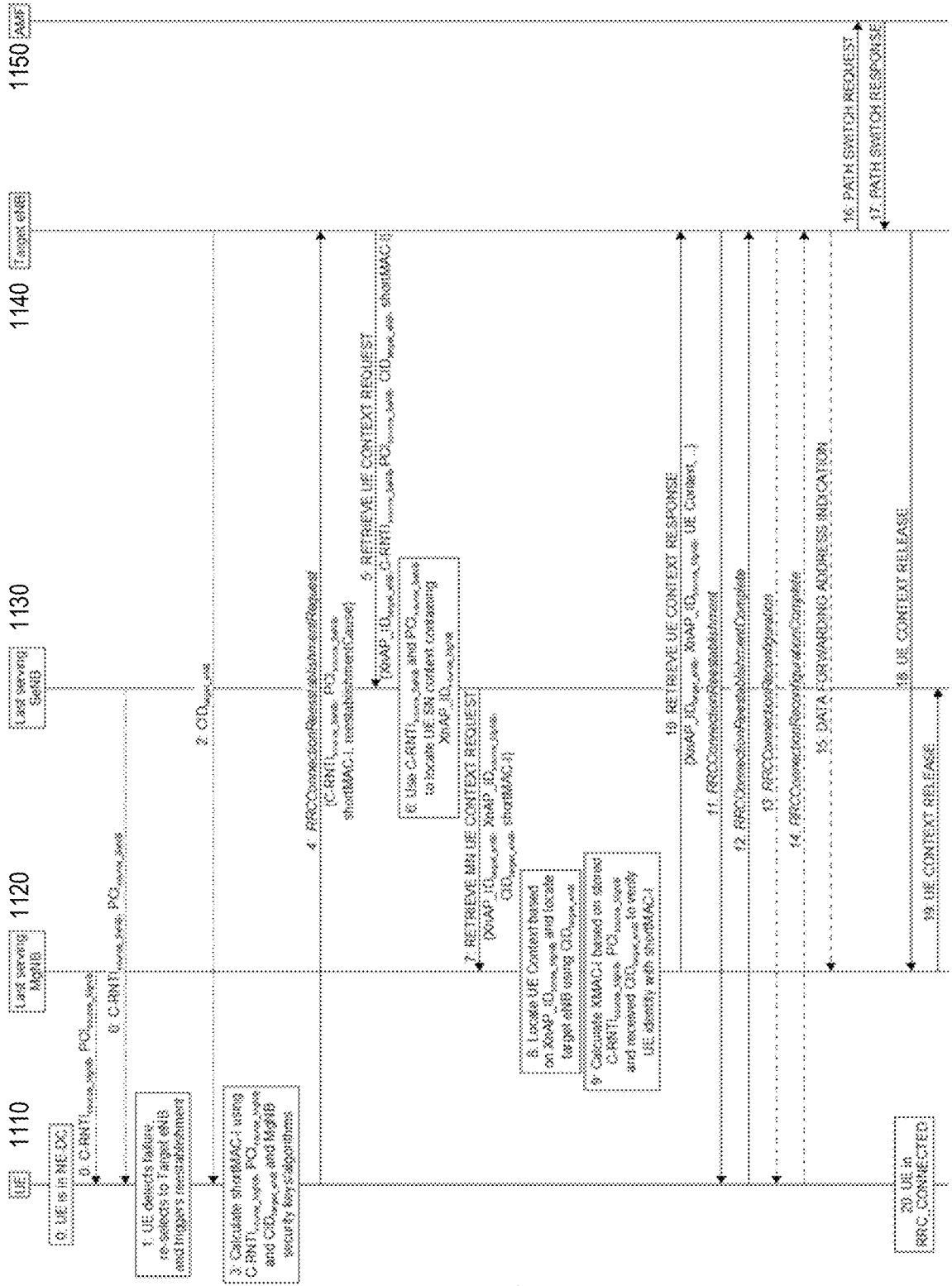
FIGS. 11-12 show signal flow diagrams for inter-RAT reestablishment from NE-DC and NGEN-DC operation, respectively, where the target MN is different from the source SN, according to various exemplary embodiments of the present disclosure.

FIG. 11 shows an exemplary signaling diagram for an inter-RAT reestablishment during NE-DC operation where the source SN (e.g., SeNB) is different than the target node, according to certain exemplary embodiments. This scenario involves a UE 1110, a current serving MgNB 1120 (providing the UE's current PCell), a current serving SeNB 1130 (providing the UE's current PSCell), and a target eNB 1140 (different from SeNB 1130) providing a target cell selected by the UE as a replacement for the UE's current PCell. Although the operations shown in FIG. 11 are given numerical labels, these labels are for facilitating explanation and do not limit the operations to occur in a particular order. The following description omits operations that are substantially identical to operations shown in FIG. 10. In other words, the descriptions of operations in FIG. 10 apply to the operations in FIG. 11 unless otherwise noted below, taking into account any difference in number labelling for substantially identical operations.

In operations 4-5, when the target eNB receives the RRCConnectionReestablishmentRequest message, it determines that the requested UE was not being served by it since the included PCI doesn't belong to one of the cells that the target eNB serves. In response, it sends a legacy RETRIEVE UE CONTEXT REQUEST message to the source eNB, which the target eNB identified based on the PCI included in RRCConnectionReestablishmentRequest message.

Operations 6-7 of FIG. 11 are similar to operations 5-6 of FIG. 10. However, in the procedure shown in FIG. 11, the target eNB sending the RETRIEVE UE CONTEXT REQUEST message is different from the node hosting the cell, as indicated in the target Cell ID. Accordingly, in operation 10, the source MN (e.g., last serving MgNB) sends the RETRIEVE UE CONTEXT RESPONSE message to a node different from the node that sent the RETRIEVE UE CONTEXT REQUEST message. Since the Cell ID in the RETRIEVE UE CONTEXT REQUEST message contains the eNB ID (as defined in 3GPP TS 38.423 v15.0.0 section 9.2.2.9), the source MN can determine the destination for the response message.

Alternately, in operation 10, the source MN can send the UE CONTEXT RETRIEVE RESPONSE message to the source SN, and the source SN can send a UE CONTEXT RETRIEVE RESPONSE message to the target node (e.g., in an operation 10a, not shown). The source SN can include the latest SCG configurations with the received UE context in this message sent to the target node. In operation 15, data forwarding address could also be indicated towards the source SeNB, e.g., for forwarding data of SN terminated bearers.

Otherwise, operations 8-18 of FIG. 11 are similar to operations 7-17 of FIG. 10. In operation 18 of FIG. 11, the target eNB sends a UE CONTEXT RELEASE message to the source MN. In operation 19, however, the source MN also sends a UE CONTEXT RELEASE message to the source SN (e.g., last serving SeNB).

Exemplary embodiments related to inter-RAT reestablishment during UE operation in NGEN-DC are substantially similar to those for inter-RAT reestablishment during NE-DC operation, discussed above with respect to FIGS. 10-11. However, the reversal of the DC roles of the two RATs introduces a requisite change in the various terminology used to describe these embodiments. For example, "source MgNB" becomes "source MeNB," with corresponding changes to all associated parameters (e.g. PCI_source_MgNB will change to PCI_source_MeNB, etc.). In addition, "source SeNB" becomes "source SgNB," with corresponding changes to all associated parameters. Likewise, "target eNB" becomes "target gNB" with corresponding changes to all associated parameters, and the messages sent to/from the UE will be NR RRC messages instead of E-UTRA RRC messages. Furthermore, any NR- or E-UTRA-specific procedure within the operations of FIGS.

10-11 will be a corresponding procedure specific to the opposite RAT during NGEN-DC operation.

Figure 12:
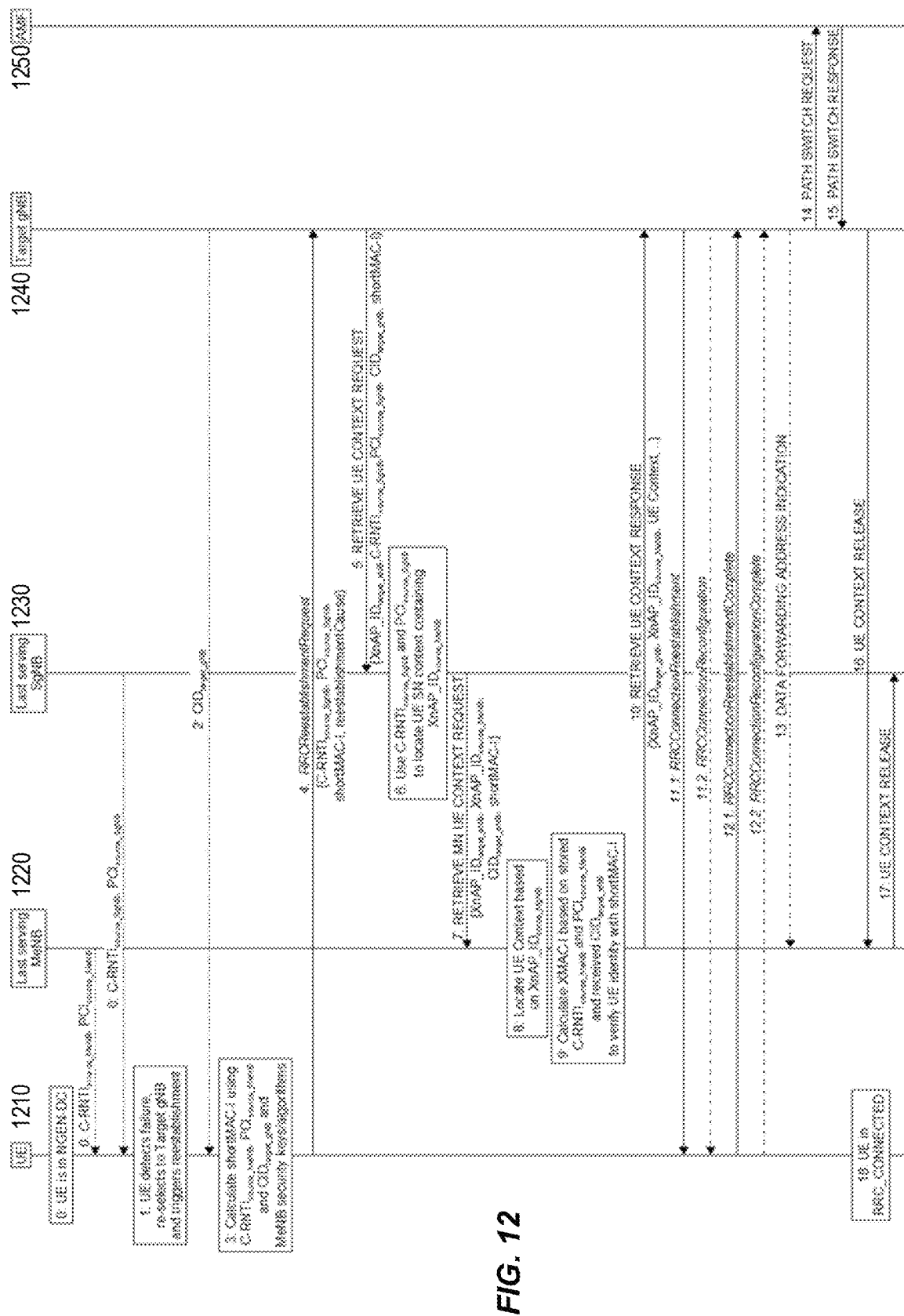

FIG. 12 shows an exemplary signaling diagram for an inter-RAT reestablishment during NGEN-DC operation where the source SN (e.g., SgNB) is different than the target node, according to certain exemplary embodiments. This scenario involves a UE 1210, a current serving MeNB 1220 (providing the UE's current PCell), a current serving SgNB 1230 (providing the UE's current PSCell), and a target gNB 1240 (different from SgNB 1230) providing a target cell selected by the UE as a replacement for the UE's current PCell. Although the operations shown in FIG. 12 are given numerical labels, these labels are for facilitating explanation and do not limit the operations to occur in a particular order. The descriptions of operations in FIGS. 10 and/or 11 apply to the operations in FIG. 12, taking into account any difference in number labelling for substantially identical operations, as well as the terminology differences between NE-DC and NGEN-DC, as discussed above.

Note that the NR RRCReestablishment message is sent via SRB1, so it can be multiplexed together with the RRCReconfiguration message, similar to embodiments discussed above with respect to NE-DC operation. In some embodiments, the NR RRCReestablishment message can be modified to include IEs needed for reconfiguring SRB2 and DRBs, similar to embodiments discussed above with respect to NE-DC operation.

As mentioned above, in some embodiments, when the Source SN sends the RETRIEVE UE CONTEXT REQUEST message to the source MN, it includes the latest SCG configurations and the source MN compiles a complete UE configuration based on that. This can be useful when SRB3 was configured in the source SN, and some SCG reconfigurations were performed by the source SN without involving the source MN.

As also mentioned above, in some embodiments, when the source MN has verified the UE identity and prepares to send the RETRIEVE UE CONTEXT RESPONSE message, instead of sending the message directly to the target node, it responds to the source SN using the XnAP_ID_source_eNB instead of XnAP_ID_target_eNB (for NE-DC, or source_gNB and target_gNB for NGEN-DC). The source SN then forwards the UE Context in a RETRIEVE UE CONTEXT RESPONSE message to the target node (eNB or gNB).

In some embodiments, the network can indicate whether the UEs and network nodes involved in reestablishment should perform procedures in the manner outlined above, or instead should perform the procedures in an existing and/or legacy manner. This can be indicated via dedicated signaling (e.g., RRCReconfiguration or RRCConnectionReconfiguration message), or using broadcast signaling (e.g., SIBs).

In various embodiments discussed above, there was identified a need for a new message, or modification to an existing message, to forward a RETRIEVE UE CONTEXT REQUEST message from the SN to the MN. For example, such message can be referred to as RETRIEVE MN UE CONTEXT REQUEST. As compared to existing messages, the difference is that the UE Context (including C-RNTI and the source MN failure cell PCI) is not included, while a new field called 'Old M-NG-RAN node UE XnAP ID Reference' is included. In other embodiments, the existing RETRIEVE UE CONTEXT REQUEST message can be extended to optionally include a new field 'Old M-NG-RAN node UE XnAP ID Reference.' This message can also be modified to not include the UE Context ID if this new field is included, or the target node receiving the message can simply ignore a UE Context ID field if the new field is also included.

FIG. 13 shows an exemplary RETRIEVE MN UE CONTEXT REQUEST message according to various embodiments of the present disclosure. The exemplary message shown in FIG. 13 can be sent from a current serving SN to a current serving MN. The message is similar in structure to the RETRIEVE UE CONTEXT REQUEST message shown in FIG. 9A, except that it includes the field Old M-NG-RAN node UE XnAP ID reference, which provides a UE identifier recognizable by the recipient MN. For example, the exemplary message shown in FIG. 13 can be included in a 3GPP specification, such as 3GPP TS 38.423 (v15.0.0).

Figure 14:
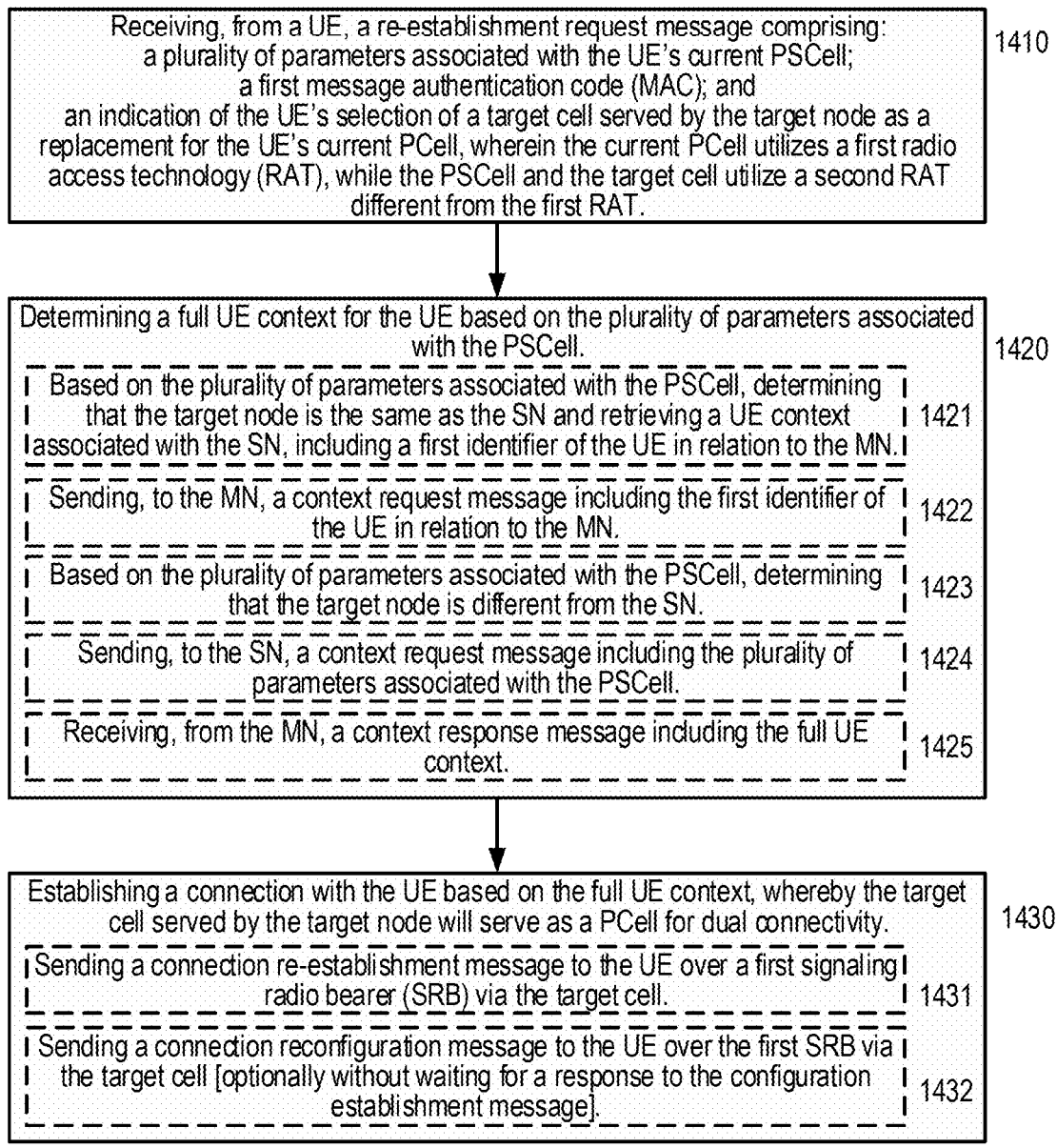
FIG. 14 is a flow diagram illustrating exemplary methods and/or procedures performed by a target node in a radio access network (RAN), according to various exemplary embodiments of the present disclosure.
Figure 15:
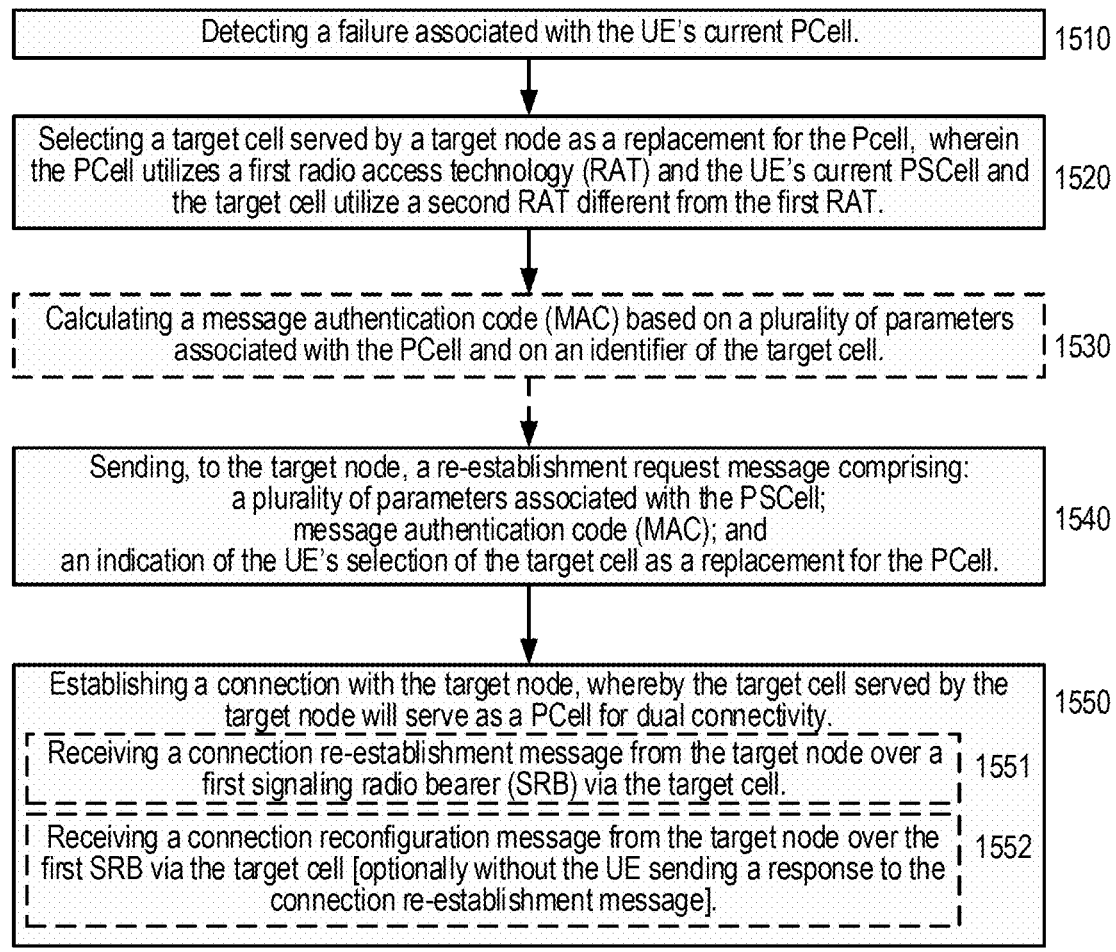
FIG. 15 is a flow diagram illustrating exemplary methods and/or procedures performed by a UE, according to various exemplary embodiments of the present disclosure.
Figure 16:
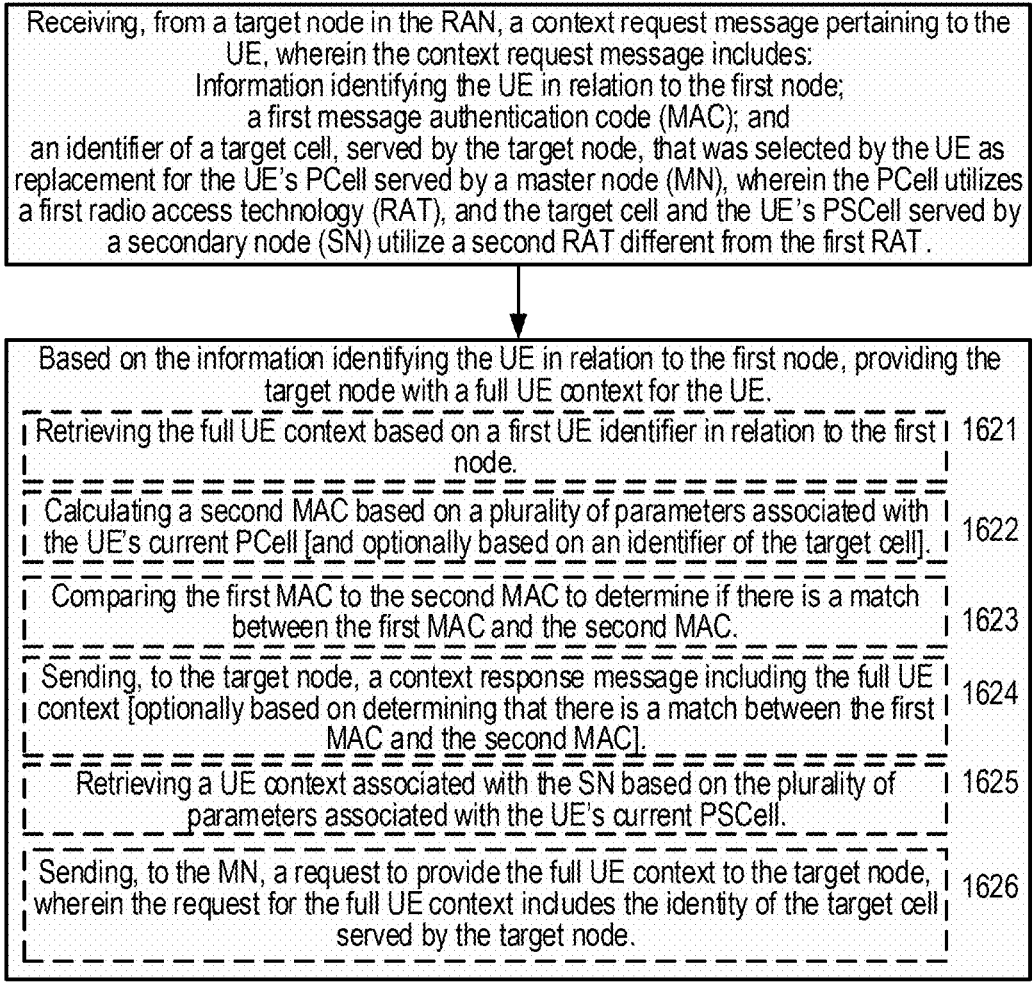
FIG. 16 is a flow diagram illustrating exemplary methods and/or procedures performed by a source node in a RAN, according to various exemplary embodiments of the present disclosure.

Embodiments discussed above in relation to FIGS. 10-13 are further illustrated by FIGS. 14-16, which show flow diagrams of exemplary methods and/or procedures performed by network nodes or UEs. For example, aspects of the various embodiments discussed in relation to FIGS. 10-13 are features of the operations shown in FIGS. 14-16.

More specifically, FIG. 14 is a flow diagram illustrating an exemplary method and/or procedure for a target node, in a radio access network (RAN), to establish a connection with a user equipment (UE) operating in dual connectivity (DC) with a master cell group (MCG) comprising a primary cell (PCell) served by a master node (MN) and with a secondary cell group (SCG) comprising a primary secondary cell (PSCell) served by a secondary node (SN), according to various exemplary embodiments of the present disclosure. The exemplary method and/or procedure shown in FIG. 14 can be implemented by a network node (e.g., eNB, gNB, ng-eNB, or components thereof) such as described in relation to other figures herein. Furthermore, the exemplary method and/or procedure shown in FIG. 14 can be utilized cooperatively with other exemplary methods and/or procedures described herein (e.g., FIGS. 15-16) to provide various exemplary benefits described herein. Although FIG. 14 shows specific blocks in a particular order, the operations of the exemplary method and/or procedure can be performed in a different order than shown and can be combined and/or divided into blocks having different functionality than shown. Optional operations are indicated by dashed lines.

The exemplary method and/or procedure illustrated in FIG. 14 can include the operations of block 1410, in which the target node can receive, from the UE, a re-establishment request message comprising a plurality of parameters associated with the PSCell, a message authentication code (MAC), and an indication of the UE's selection of a target cell served by the target node as a replacement for the PCell. The PCell can utilized a first radio access technology (RAT), while the PSCell and the target cell utilize a second RAT different from the first RAT. In some embodiments, one of the first RAT and the second RAT is New Radio (NR), and the other of the first RAT and the second RAT is Long-Term Evolution Evolved UTRA (LTE E-UTRA).

In some embodiments, the plurality of parameters associated with the PSCell can include an identifier of the PSCell and an identifier of the UE in relation to the PSCell. In some embodiments, the MAC included in the re-establishment request message can be based on a plurality of parameters associated with the PCell and on an identifier of the target cell. In some embodiments, the plurality of parameters associated with the PCell can include an identifier of the PCell, an identifier of the UE in relation to the PCell, and integrity protection information associated with the MN.

The exemplary method and/or procedure can also include the operations of block 1420, in which the network node can, based on the plurality of parameters associated with the PSCell, determine a full UE context for the UE. The exemplary method and/or procedure can also include the operations of block 1430, in which the network node can establish a connection with the UE based on the full UE context, whereby the target cell served by the target node will serve as a PCell for DC.

In some embodiments, determining the full UE context in block 1420 can include the operations of sub-blocks 1421, 1422, and 1425. In sub-block 1421, the target node can perform the following operations based on the plurality of parameters associated with the PSCell: determining that the target node is the same as the SN, and retrieving a UE context associated with the SN, wherein the UE context associated with the SN includes a first identifier of the UE in relation to the MN. In sub-block 1422, the target node can send, to the MN, a context request message including the first identifier of the UE in relation to the MN. In some embodiments, the context request message can also include the MAC and/or an identifier of the target cell. In sub-block 1425, the target node can receive, from the MN, a context response message including the full UE context (e.g., based on successful verification of the first MAC by the MN).

In other embodiments, determining the full UE context in block 1420 can include the operations of sub-blocks 1423, 1424, and 1425. In sub-block 1423, the target node can, based on the plurality of parameters associated with the PSCell, determine that the target node is different than the SN. In sub-block 1424, the target node can send, to the SN, a context request message including the plurality of parameters associated with the PSCell. In some embodiments, the context request message can also include the MAC and/or an identifier of the target cell. In sub-block 1635, the target node can receive, from the MN, a context response message including the full UE context (e.g., based on successful verification of the MAC by the MN).

In various embodiments, the context request message (e.g., sent in sub-blocks 1422 and/or 1424) and the context response message (e.g., received in sub-block 1425) can also include an identifier of the UE in relation to the target node.

In some embodiments, establishing the connection in block 1430 can include the operations of sub-block 1431, where the target node can send a connection re-establishment message to the UE over a first signaling radio bearer (SRB) via the target cell. In some embodiments, the connection re-establishment message can include fields usable to configure at least one of the following between the target node and the UE: one or more additional SRBs, and one or more data radio bearers (DRBs).

In other embodiments, the operations of block 1430 can also include the operations of sub-block 1432, where the target node can send a connection reconfiguration message to the UE over the first SRB via the target cell. For example, the connection reconfiguration message can be sent waiting for a response to the configuration establishment message.

In addition, FIG. 15 is a flow diagram illustrating an exemplary method and/or procedure performed by a user equipment (UE) operating in dual connectivity (DC), in a radio access network (RAN), with a master cell group (MCG) comprising a primary cell (PCell) served by a master node (MN) and with a secondary cell group (SCG) comprising a primary secondary cell (PSCell) served by a secondary node (SN), according to various exemplary embodiments of the present disclosure. The exemplary method and/or procedure shown in FIG. 15 can be implemented by a UE (e.g., wireless device) configured as described in relation to other figures herein. Furthermore, the exemplary method and/or procedure shown in FIG. 15 can be utilized cooperatively with other exemplary methods and/or procedures described herein (e.g., FIGS. 14 and/or 16) to provide various exemplary benefits described herein. Although FIG. 15 shows specific blocks in a particular order, the operations of the exemplary method and/or procedure can be performed in a different order than shown and can be combined and/or divided into blocks having different functionality than shown. Optional operations are indicated by dashed lines.

The exemplary method and/or procedure illustrated in FIG. 15 can include the operations of block 1510, in which the UE can detect a failure associated with the UE's current PCell. The exemplary method and/or procedure can also include the operations of block 1520, in which the UE can select target cell served by a target node as a replacement for the PCell. The PCell can utilize a first radio access technology (RAT), while the PSCell and the target cell can utilize a second RAT different from the first RAT. In some embodiments, one of the first RAT and the second RAT is New Radio (NR), and the other of the first RAT and the second RAT is Long-Term Evolution Evolved UTRA (LTE E-UTRA).

The exemplary method and/or procedure can also include the operations of block 1540, in which the UE can send, to the target node, a re-establishment request message comprising a plurality of parameters associated with the PSCell, a message authentication code (MAC), and an indication of the UE's selection of the target cell as a replacement for the PCell. In some embodiments, the plurality of parameters associated with the PSCell can include an identifier of the PSCell, and an identifier of the UE in relation to the PSCell. In some embodiments, the exemplary method and/or procedure can also include the operations of block 1530, in which the UE can calculate the MAC based on an identifier of the target cell and a plurality of parameters associated with the PCell.

In some embodiments, the plurality of parameters associated with the PCell can include an identifier of the PCell, an identifier of the UE in relation to the PCell, and integrity protection information associated with the MCG. In some embodiments, calculating the MAC can also be based on one of the following conversions: the identifier of the target cell into a format associated with the first RAT, or at least one of the parameters associated with the PCell into a format associated with the second RAT.

The exemplary method and/or procedure can also include the operations of block 1550, in which the UE can establish a connection with the target node, whereby the target cell served by the target node will serve as a PCell for DC. In some embodiments, the operations of block 1550 can include the operations of sub-block 1551, where the UE can receive a connection re-establishment message from the target node over a first signaling radio bearer (SRB) via the target cell.

In some embodiments, the connection re-establishment message can include fields usable to configure at least one of the following between the target node and the UE: one or more additional SRBs, and one or more data radio bearers (DRBs). In other embodiments, the operations of block 1550 can also include the operations of sub-block 1552, where the UE can receive a connection reconfiguration message to the UE over the first SRB via the target cell. For example, the connection reconfiguration message can be received without the UE sending a response to the connection re-establishment message (e.g., received in sub-block 1551).

In addition, FIG. 16 is a flow diagram illustrating an exemplary method and/or procedure performed by a first node, in a radio access network (RAN), that is operating in dual connectivity (DC) toward a user equipment (UE) together with a second node in the RAN, according to various exemplary embodiments of the present disclosure. The exemplary method and/or procedure shown in FIG. 16 can be performed by a source node (e.g., MN, SN, MeNB, SeNB, MgNB, SgNB, etc. or components thereof) with respect to a particular UE. Furthermore, the exemplary method and/or procedure shown in FIG. 16 can be utilized cooperatively with other exemplary methods and/or procedures described herein (e.g., FIGS. 14-15) to provide various exemplary benefits described herein. Although FIG. 16 shows specific blocks in a particular order, the operations of the exemplary method and/or procedure can be performed in a different order than shown and can be combined and/or divided into blocks having different functionality than shown. Optional operations are indicated by dashed lines.

The exemplary method and/or procedure illustrated in FIG. 16 can include the operations of block 1610, in which the first node can receive, from a target node in the RAN, a context request message pertaining to the UE. The context request message can include information identifying the UE in relation to the first node, a first message authentication code (MAC), and an identifier of a target cell, served by the target node, that was selected by the UE as replacement for the UE's current primary cell (PCell) that is part of a master cell group (MCG) served by a master node (MN). The UE's current primary secondary cell (PSCell) is part of a secondary cell group (SCG) served by a secondary node (SN). The PCell can utilize a first radio access technology (RAT), while the target cell and PSCell can utilize a second RAT different from the first RAT. In some embodiments, one of the first RAT and the second RAT is New Radio (NR), and the other of the first RAT and the second RAT is Long-Term Evolution Evolved UTRA (LTE E-UTRA).

The exemplary method and/or procedure can also include the operations of block 1620, in which the first node can, based on the information identifying the UE in relation to the first node, providing the target node with a full UE context for the UE.

In some embodiments, the first node is the MN serving the PCell and the second node the SN serving the PSCell, and the information identifying the UE comprises a first UE identifier in relation to the first node. In such embodiments, the operations of block 1620 can include the operations of sub-blocks 1621 and 1624, where the first node can retrieve the full UE context based on the first UE identifier, and send, to the target node, a context response message including the full UE context.

In such embodiments, the operations of block 1620 can optionally include the operations of sub-blocks 1622 and 1623. In sub-block 1622, the first node can calculate a second MAC based on a plurality of parameters associated with the current PCell. In some embodiments, the plurality of parameters associated with the UE's current PCell can include an identifier of the PCell, an identifier of the UE in relation to the PCell, and integrity protection information associated with the MN. In some embodiments, calculating the second MAC can also be based on the identifier of the target cell (e.g., received in block 1610).

In sub-block 1623, the first node can compare the second MAC to the first MAC to determine if there is a match between the first MAC and the second MAC. In such embodiments, sending the context response message including the full UE context (e.g., in sub-block 1624) can be based on determining that there is a match between the first MAC and the second MAC.

In some embodiments, the second node is the MN serving the PCell, the first node is the SN serving the PSCell in the SCG, and the information identifying the UE comprises a plurality of parameters associated with the PSCell. In such embodiments, the operations of block 1620 can include the operations of sub-blocks 1625-1626. In sub-block 1625, the first node can retrieve a UE context associated with the SN based on the plurality of parameters associated with the UE's current PSCell. In some embodiments, the UE context associated with the SN includes an identity of the UE in relation to the MN.

In sub-block 1626, the first node can send, to the MN, a request to provide the full UE context to the target node, wherein the request for the full UE context includes the identity of the target cell served by the target node. In some embodiments, the identity of the UE in relation to the MN is included in the request to provide the full UE context to the target node.

Figure 17:
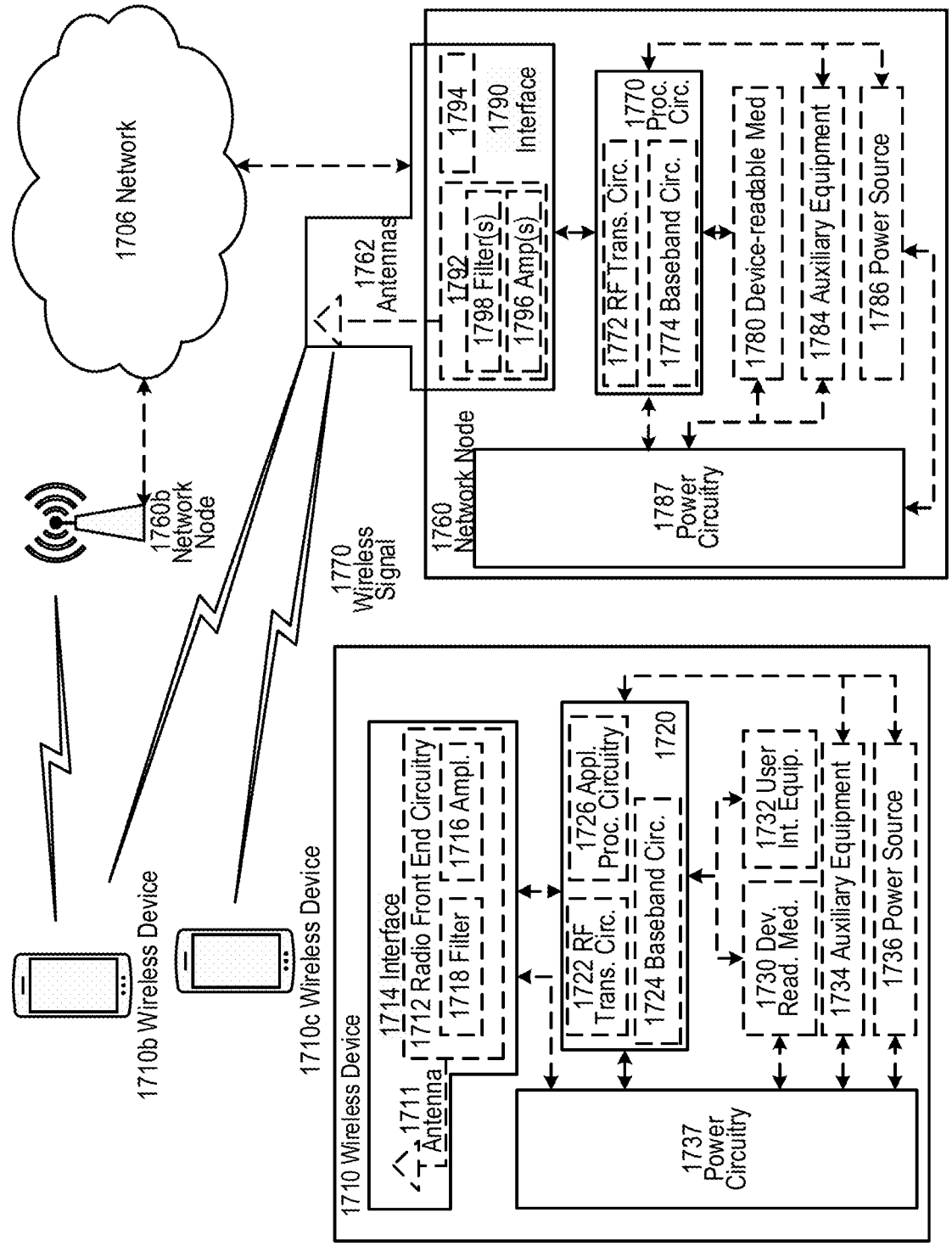
FIG. 17 illustrates an exemplary embodiment of a wireless network, in accordance with various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760*b*, and WDs 1710, 1710*b*, and 1710*c*. In practice, a wireless network can further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.17 standards; and/or any other appropriate wireless communication standard, such as the Worldwide Interoperability for Microwave Access (WiMax), Bluetooth, Z-Wave and/or ZigBee standards.

Network 1706 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points) and base stations (BS, e.g., radio base stations, NBs, eNBs, and gNBs). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1760 are depicted as single boxes located within a larger box, or nested within multiple boxes, in practice, a network node can comprise multiple different physical components that make up a single illustrated component (e.g., device readable medium 1780 can comprise multiple separate hard drives as well as multiple RAM modules).

Similarly, network node 1760 can be composed of multiple physically separate components (e.g., a NodeB component and an RNC component, or a BTS component and a BSC component, etc.), which can each have their own respective components. In certain scenarios in which network node 1760 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1760 can be configured to support multiple radio access technologies (RATs). In such embodiments, some components can be duplicated (e.g., separate device readable medium 1780 for the different RATs) and some components can be reused (e.g., the same antenna 1762 can be shared by the RATs). Network node 1760 can also include multiple sets of the various illustrated components for different wireless technologies integrated into network node 1760, such as, for example, GSM, WCDMA, LTE, NR, WiFi, or Bluetooth wireless technologies. These wireless technologies can be integrated into the same or different chip or set of chips and other components within network node 1760.

Processing circuitry 1770 can be configured to perform any determining, calculating, or similar operations (e.g., certain obtaining operations) described herein as being provided by a network node. These operations performed by processing circuitry 1770 can include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1760 components, such as device readable medium 1780, network node 1760 functionality. For example, processing circuitry 1770 can execute instructions stored in device readable medium 1780 or in memory within processing circuitry 1770. Such functionality can include providing any of the various wireless features, functions, or benefits discussed herein. In some embodiments, processing circuitry 1770 can include a system on a chip (SOC).

In some embodiments, processing circuitry 1770 can include one or more of radio frequency (RF) transceiver circuitry 1772 and baseband processing circuitry 1774. In some embodiments, radio frequency (RF) transceiver circuitry 1772 and baseband processing circuitry 1774 can be on separate chips (or sets of chips), boards, or units, such as radio units and digital units. In alternative embodiments, part or all of RF transceiver circuitry 1772 and baseband processing circuitry 1774 can be on the same chip or set of chips, boards, or units In certain embodiments, some or all of the functionality described herein as being provided by a network node, base station, eNB or other such network device can be performed by processing circuitry 1770 executing instructions stored on device readable medium 1780 or memory within processing circuitry 1770. In alternative embodiments, some or all of the functionality can be provided by processing circuitry 1770 without executing instructions stored on a separate or discrete device readable medium, such as in a hard-wired manner. In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760, but are enjoyed by network node 1760 as a whole, and/or by end users and the wireless network generally.

Device readable medium 1780 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1770. Device readable medium 1780 can store any suitable instructions, data or information, including a computer program, software, an application including one or more of logic, rules, code, tables, etc. and/or other instructions capable of being executed by processing circuitry 1770 and, utilized by network node 1760. Device readable medium 1780 can be used to store any calculations made by processing circuitry 1770 and/or any data received via interface 1790. In some embodiments, processing circuitry 1770 and device readable medium 1780 can be considered to be integrated.

Interface 1790 is used in the wired or wireless communication of signaling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that can be coupled to, or in certain embodiments a part of, antenna 1762. Radio front end circuitry 1792 comprises filters 1798 and amplifiers 1796. Radio front end circuitry 1792 can be connected to antenna 1762 and processing circuitry 1770. Radio front end circuitry can be configured to condition signals communicated between antenna 1762 and processing circuitry 1770. Radio front end circuitry 1792 can receive digital data that is to be sent out to other network nodes or WDs via a wireless connection. Radio front end circuitry 1792 can convert the digital data into a radio signal having the appropriate channel and bandwidth parameters using a combination of filters 1798 and/or amplifiers 1796. The radio signal can then be transmitted via antenna 1762. Similarly, when receiving data, antenna 1762 can collect radio signals which are then converted into digital data by radio front end circuitry 1792. The digital data can be passed to processing circuitry 1770. In other embodiments, the interface can comprise different components and/or different combinations of components.

In certain alternative embodiments, network node 1760 may not include separate radio front end circuitry 1792, instead, processing circuitry 1770 can comprise radio front end circuitry and can be connected to antenna 1762 without separate radio front end circuitry 1792. Similarly, in some embodiments, all or some of RF transceiver circuitry 1772 can be considered a part of interface 1790. In still other embodiments, interface 1790 can include one or more ports or terminals 1794, radio front end circuitry 1792, and RF transceiver circuitry 1772, as part of a radio unit (not shown), and interface 1790 can communicate with baseband processing circuitry 1774, which is part of a digital unit (not shown).

Antenna 1762 can include one or more antennas, or antenna arrays, configured to send and/or receive wireless signals. Antenna 1762 can be coupled to radio front end circuitry 1790 and can be any type of antenna capable of transmitting and receiving data and/or signals wirelessly. In some embodiments, antenna 1762 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1762 can be separate from network node 1760 and can be connectable to network node 1760 through an interface or port.

Antenna 1762, interface 1790, and/or processing circuitry 1770 can be configured to perform any receiving operations and/or certain obtaining operations described herein as being performed by a network node. Any information, data and/or signals can be received from a wireless device, another network node and/or any other network equipment. Similarly, antenna 1762, interface 1790, and/or processing circuitry 1770 can be configured to perform any transmitting operations described herein as being performed by a network node. Any information, data and/or signals can be transmitted to a wireless device, another network node and/or any other network equipment.

Power circuitry 1787 can comprise, or be coupled to, power management circuitry and can be configured to supply the components of network node 1760 with power for performing the functionality described herein. Power circuitry 1787 can receive power from power source 1786. Power source 1786 and/or power circuitry 1787 can be configured to provide power to the various components of network node 1760 in a form suitable for the respective components (e.g., at a voltage and current level needed for each respective component). Power source 1786 can either be included in, or external to, power circuitry 1787 and/or network node 1760. For example, network node 1760 can be connectable to an external power source (e.g., an electricity outlet) via an input circuitry or interface such as an electrical cable, whereby the external power source supplies power to power circuitry 1787. As a further example, power source 1786 can comprise a source of power in the form of a battery or battery pack which is connected to, or integrated in, power circuitry 1787. The battery can provide backup power should the external power source fail. Other types of power sources, such as photovoltaic devices, can also be used.

Alternative embodiments of network node 1760 can include additional components beyond those shown in FIG. 17 that can be responsible for providing certain aspects of the network node's functionality, including any of the functionality described herein and/or any functionality necessary to support the subject matter described herein. For example, network node 1760 can include user interface equipment to allow and/or facilitate input of information into network node 1760 and to allow and/or facilitate output of information from network node 1760. This can allow and/or facilitate a user to perform diagnostic, maintenance, repair, and other administrative functions for network node 1760.

In some embodiments, a wireless device (WD, e.g., WD 1710) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1710 includes antenna 1711, interface 1714, processing circuitry 1720, device readable medium 1730, user interface equipment 1732, auxiliary equipment 1734, power source 1736 and power circuitry 1737. WD 1710 can include multiple sets of one or more of the illustrated components for different wireless technologies supported by WD 1710, such as, for example, GSM, WCDMA, LTE, NR, WiFi, WiMAX, or Bluetooth wireless technologies, just to mention a few. These wireless technologies can be integrated into the same or different chips or set of chips as other components within WD 1710.

Antenna 1711 can include one or more antennas or antenna arrays, configured to send and/or receive wireless signals, and is connected to interface 1714. In certain alternative embodiments, antenna 1711 can be separate from WD 1710 and be connectable to WD 1710 through an interface or port. Antenna 1711, interface 1714, and/or processing circuitry 1720 can be configured to perform any receiving or transmitting operations described herein as being performed by a WD. Any information, data and/or signals can be received from a network node and/or another WD. In some embodiments, radio front end circuitry and/or antenna 1711 can be considered an interface.

As illustrated, interface 1714 comprises radio front end circuitry 1712 and antenna 1711. Radio front end circuitry 1712 comprise one or more filters 1718 and amplifiers 1716. Radio front end circuitry 1714 is connected to antenna 1711 and processing circuitry 1720, and can be configured to condition signals communicated between antenna 1711 and processing circuitry 1720. Radio front end circuitry 1712 can be coupled to or a part of antenna 1711. In some embodiments, WD 1710 may not include separate radio front end circuitry 1712; rather, processing circuitry 1720 can comprise radio front end circuitry and can be connected to antenna 1711. Similarly, in some embodiments, some or all of RF transceiver circuitry 1722 can be considered a part of interface 1714. Radio front end circuitry 1712 can receive digital data that is to be sent out to other network nodes or WDs via a wireless connection. Radio front end circuitry 1712 can convert the digital data into a radio signal having the appropriate channel and bandwidth parameters using a combination of filters 1718 and/or amplifiers 1716. The radio signal can then be transmitted via antenna 1711. Similarly, when receiving data, antenna 1711 can collect radio signals which are then converted into digital data by radio front end circuitry 1712. The digital data can be passed to processing circuitry 1720. In other embodiments, the interface can comprise different components and/or different combinations of components.

Processing circuitry 1720 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1710 components, such as device readable medium 1730, WD 1710 functionality. Such functionality can include providing any of the various wireless features or benefits discussed herein. For example, processing circuitry 1720 can execute instructions stored in device readable medium 1730 or in memory within processing circuitry 1720 to provide the functionality disclosed herein.

As illustrated, processing circuitry 1720 includes one or more of RF transceiver circuitry 1722, baseband processing circuitry 1724, and application processing circuitry 1726. In other embodiments, the processing circuitry can comprise different components and/or different combinations of components. In certain embodiments processing circuitry 1720 of WD 1710 can comprise a SOC. In some embodiments, RF transceiver circuitry 1722, baseband processing circuitry 1724, and application processing circuitry 1726 can be on separate chips or sets of chips. In alternative embodiments, part or all of baseband processing circuitry 1724 and application processing circuitry 1726 can be combined into one chip or set of chips, and RF transceiver circuitry 1722 can be on a separate chip or set of chips. In still alternative embodiments, part or all of RF transceiver circuitry 1722 and baseband processing circuitry 1724 can be on the same chip or set of chips, and application processing circuitry 1726 can be on a separate chip or set of chips. In yet other alternative embodiments, part or all of RF transceiver circuitry 1722, baseband processing circuitry 1724, and application processing circuitry 1726 can be combined in the same chip or set of chips. In some embodiments, RF transceiver circuitry 1722 can be a part of interface 1714. RF transceiver circuitry 1722 can condition RF signals for processing circuitry 1720.

In certain embodiments, some or all of the functionality described herein as being performed by a WD can be provided by processing circuitry 1720 executing instructions stored on device readable medium 1730, which in certain embodiments can be a computer-readable storage medium. In alternative embodiments, some or all of the functionality can be provided by processing circuitry 1720 without executing instructions stored on a separate or discrete device readable storage medium, such as in a hard-wired manner. In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 can be configured to perform any determining, calculating, or similar operations (e.g., certain obtaining operations) described herein as being performed by a WD. These operations, as performed by processing circuitry 1720, can include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 can be operable to store a computer program, software, an application including one or more of logic, rules, code, tables, etc. and/or other instructions capable of being executed by processing circuitry 1720. Device readable medium 1730 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1720. In some embodiments, processing circuitry 1720 and device readable medium 1730 can be considered to be integrated.

User interface equipment 1732 can include components that allow and/or facilitate a human user to interact with WD 1710. Such interaction can be of many forms, such as visual, audial, tactile, etc. User interface equipment 1732 can be operable to produce output to the user and to allow and/or facilitate the user to provide input to WD 1710. The type of interaction can vary depending on the type of user interface equipment 1732 installed in WD 1710. For example, if WD 1710 is a smart phone, the interaction can be via a touch screen; if WD 1710 is a smart meter, the interaction can be through a screen that provides usage (e.g., the number of gallons used) or a speaker that provides an audible alert (e.g., if smoke is detected). User interface equipment 1732 can include input interfaces, devices and circuits, and output interfaces, devices and circuits. User interface equipment 1732 can be configured to allow and/or facilitate input of information into WD 1710, and is connected to processing circuitry 1720 to allow and/or facilitate processing circuitry 1720 to process the input information. User interface equipment 1732 can include, for example, a microphone, a proximity or other sensor, keys/buttons, a touch display, one or more cameras, a USB port, or other input circuitry. User interface equipment 1732 is also configured to allow and/or facilitate output of information from WD 1710, and to allow and/or facilitate processing circuitry 1720 to output information from WD 1710. User interface equipment 1732 can include, for example, a speaker, a display, vibrating circuitry, a USB port, a headphone interface, or other output circuitry. Using one or more input and output interfaces, devices, and circuits, of user interface equipment 1732, WD 1710 can communicate with end users and/or the wireless network, and allow and/or facilitate them to benefit from the functionality described herein.

Auxiliary equipment 1734 is operable to provide more specific functionality which may not be generally performed by WDs. This can comprise specialized sensors for doing measurements for various purposes, interfaces for additional types of communication such as wired communications etc. The inclusion and type of components of auxiliary equipment 1734 can vary depending on the embodiment and/or scenario.

Power source 1736 can, in some embodiments, be in the form of a battery or battery pack. Other types of power sources, such as an external power source (e.g., an electricity outlet), photovoltaic devices or power cells, can also be used. WD 1710 can further comprise power circuitry 1737 for delivering power from power source 1736 to the various parts of WD 1710 which need power from power source 1736 to carry out any functionality described or indicated herein. Power circuitry 1737 can in certain embodiments comprise power management circuitry. Power circuitry 1737 can additionally or alternatively be operable to receive power from an external power source; in which case WD 1710 can be connectable to the external power source (such as an electricity outlet) via input circuitry or an interface such as an electrical power cable. Power circuitry 1737 can also in certain embodiments be operable to deliver power from an external power source to power source 1736. This can be, for example, for the charging of power source 1736. Power circuitry 1737 can perform any converting or other modification to the power from power source 1736 to make it suitable for supply to the respective components of WD 1710.

Figure 18:
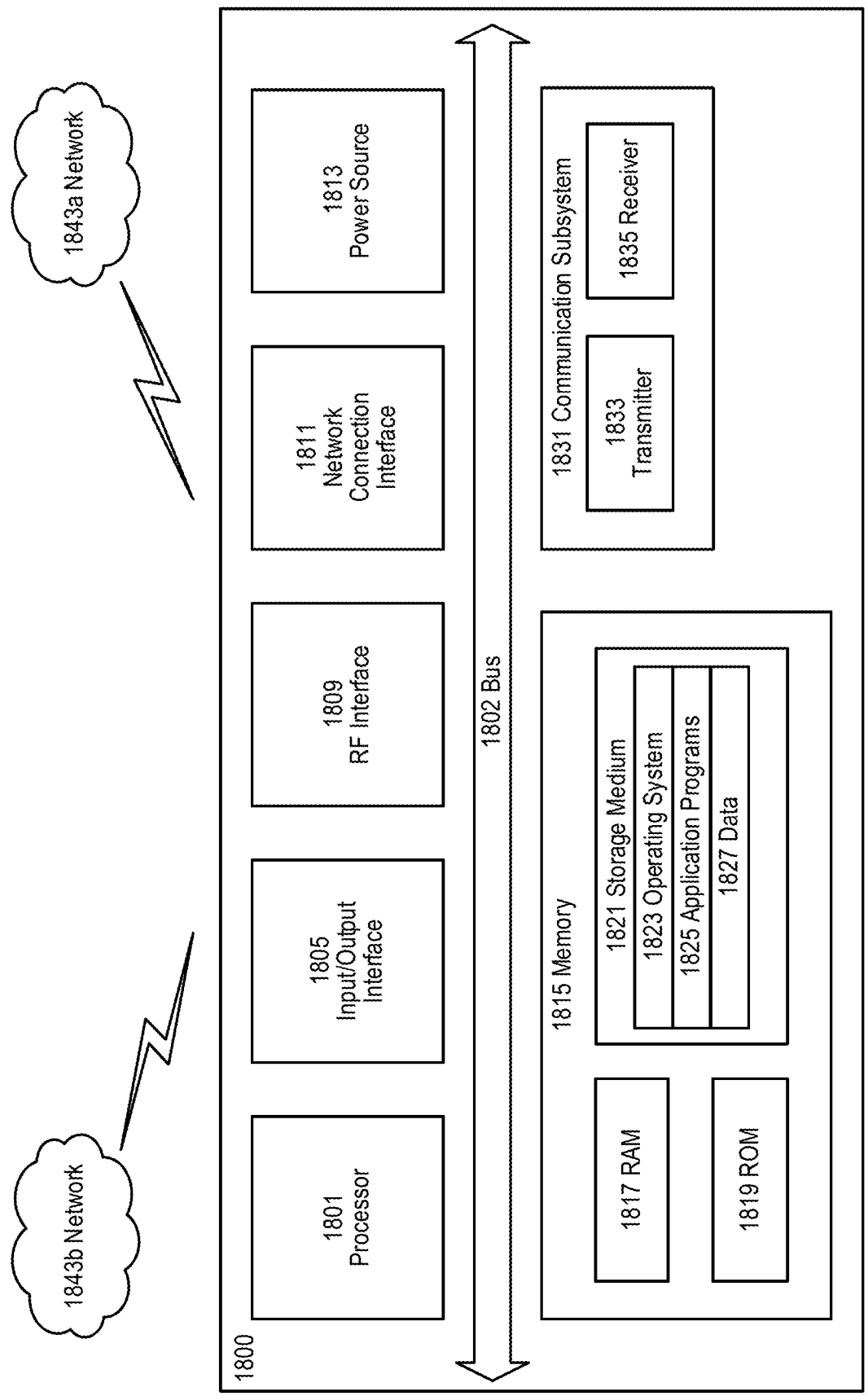
FIG. 18 illustrates an exemplary embodiment of a UE, in accordance with various exemplary embodiments of the present disclosure.

FIG. 18 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1800 can be any UE identified by the $3^{rd}$ Generation Partnership Project (3GPP), including aNB-IoT UE, a machine type communication (MTC) UE, and/or an enhanced MTC (eMTC) UE. UE 1800, as illustrated in FIG. 18, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1817, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 can include other similar types of information. Certain UEs can utilize all of the components shown in FIG. 18, or only a subset of the components. The level of integration between the components can vary from one UE to another UE. Further, certain UEs can contain multiple instances of a component, such as multiple processors, memories, transceivers, transmitters, receivers, etc.

In FIG. 18, processing circuitry 1801 can be configured to process computer instructions and data. Processing circuitry 1801 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 can include two central processing units (CPUs). Data can be information in a form suitable for use by a computer.

In the depicted embodiment, input/output interface 1805 can be configured to provide a communication interface to an input device, output device, or input and output device. UE 1800 can be configured to use an output device via input/output interface 1805. An output device can use the same type of interface port as an input device. For example, a USB port can be used to provide input to and output from UE 1800. The output device can be a speaker, a sound card, a video card, a display, a monitor, a printer, an actuator, an emitter, a smartcard, another output device, or any combination thereof. UE 1800 can be configured to use an input device via input/output interface 1805 to allow and/or facilitate a user to capture information into UE 1800. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 18, RF interface 1809 can be configured to provide a communication interface to RF components such as a transmitter, a receiver, and an antenna. Network connection interface 1811 can be configured to provide a communication interface to network 1843a. Network 1843a can encompass wired and/or wireless networks such as a local-area network (LAN), a wide-area network (WAN), a computer network, a wireless network, a telecommunications network, another like network or any combination thereof. For example, network 1843a can comprise a Wi-Fi network. Network connection interface 1811 can be configured to include a receiver and a transmitter interface used to communicate with one or more other devices over a communication network according to one or more communication protocols, such as Ethernet, TCP/IP, SONET, ATM, or the like. Network connection interface 1811 can implement receiver and transmitter functionality appropriate to the communication network links (e.g., optical, electrical, and the like). The transmitter and receiver functions can share circuit components, software or firmware, or alternatively can be implemented separately.

RAM 1817 can be configured to interface via bus 1802 to processing circuitry 1801 to provide storage or caching of data or computer instructions during the execution of software programs such as the operating system, application programs, and device drivers. ROM 1819 can be configured to provide computer instructions or data to processing circuitry 1801. For example, ROM 1819 can be configured to store invariant low-level system code or data for basic system functions such as basic input and output (I/O), startup, or reception of keystrokes from a keyboard that are stored in a non-volatile memory. Storage medium 1821 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1821 can be configured to include operating system 1823, application program 1825 such as a web browser application, a widget or gadget engine or another application, and data file 1827. Storage medium 1821 can store, for use by UE 1800, any of a variety of various operating systems or combinations of operating systems.

Storage medium 1821 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 can allow and/or facilitate UE 1800 to access computer-executable instructions, application programs or the like, stored on transitory or non-transitory memory media, to off-load data, or to upload data. An article of manufacture, such as one utilizing a communication system can be tangibly embodied in storage medium 1821, which can comprise a device readable medium.

In FIG. 18, processing circuitry 1801 can be configured to communicate with network 1843b using communication subsystem 1831. Network 1843a and network 1843b can be the same network or networks or different network or networks. Communication subsystem 1831 can be configured to include one or more transceivers used to communicate with network 1843b. For example, communication subsystem 1831 can be configured to include one or more transceivers used to communicate with one or more remote transceivers of another device capable of wireless communication such as another WD, UE, or base station of a radio access network (RAN) according to one or more communication protocols, such as IEEE 802.18, CDMA, WCDMA, GSM, LTE, UTRAN, WiMax, or the like. Each transceiver can include transmitter 1833 and/or receiver 1835 to implement transmitter or receiver functionality, respectively, appropriate to the RAN links (e.g., frequency allocations and the like). Further, transmitter 1833 and receiver 1835 of each transceiver can share circuit components, software or firmware, or alternatively can be implemented separately.

In the illustrated embodiment, the communication functions of communication subsystem 1831 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 can include cellular communication, Wi-Fi communication, Bluetooth communication, and GPS communication. Network 1843b can encompass wired and/or wireless networks such as a local-area network (LAN), a wide-area network (WAN), a computer network, a wireless network, a telecommunications network, another like network or any combination thereof. For example, network 1843b can be a cellular network, a Wi-Fi network, and/or a near-field network. Power source 1813 can be configured to provide alternating current (AC) or direct current (DC) power to components of UE 1800.

The features, benefits and/or functions described herein can be implemented in one of the components of UE 1800 or partitioned across multiple components of UE 1800. Further, the features, benefits, and/or functions described herein can be implemented in any combination of hardware, software or firmware. In one example, communication subsystem 1831 can be configured to include any of the components described herein. Further, processing circuitry 1801 can be configured to communicate with any of such components over bus 1802. In another example, any of such components can be represented by program instructions stored in memory that when executed by processing circuitry 1801 perform the corresponding functions described herein. In another example, the functionality of any of such components can be partitioned between processing circuitry 1801 and communication subsystem 1831. In another example, the non-computationally intensive functions of any of such components can be implemented in software or firmware and the computationally intensive functions can be implemented in hardware.

Figure 19:
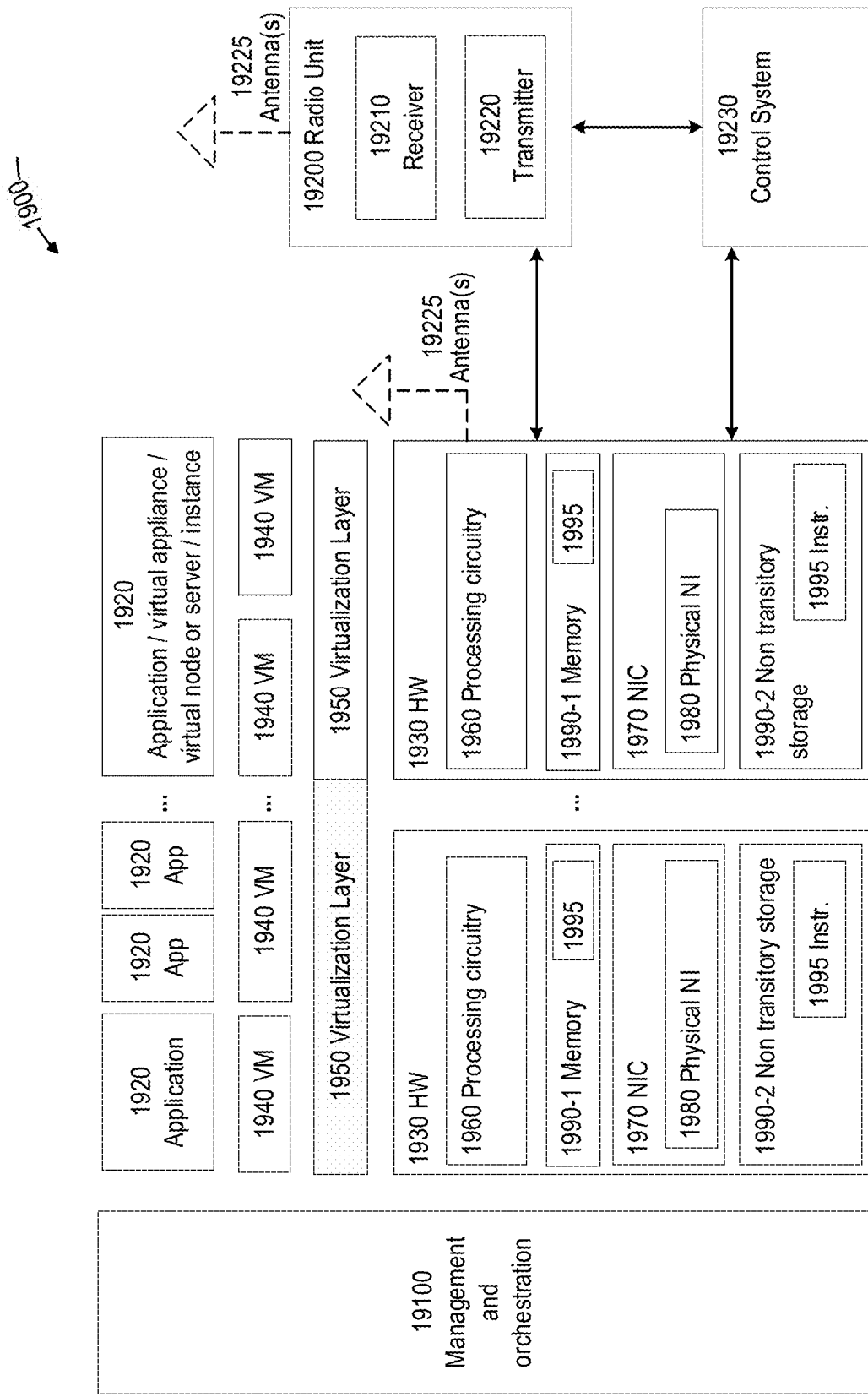
FIG. 19 is a block diagram illustrating an exemplary virtualization environment usable for implementation of various embodiments of network nodes described herein.

FIG. 19 is a schematic block diagram illustrating a virtualization environment 1900 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station, a virtualized radio access node, virtualized core network node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node can be entirely virtualized.

The functions can be implemented by one or more applications 1920 (which can alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900, comprises general-purpose or special-purpose network hardware devices 1930 comprising a set of one or more processors or processing circuitry 1960, which can be commercial off-the-shelf (COTS) processors, dedicated Application Specific Integrated Circuits (ASICs), or any other type of processing circuitry including digital or analog hardware components or special purpose processors. Each hardware device can comprise memory 1990-1 which can be non-persistent memory for temporarily storing instructions 1995 or software executed by processing circuitry 1960. Each hardware device can comprise one or more network interface controllers (NICs) 1970, also known as network interface cards, which include physical network interface 1980. Each hardware device can also include non-transitory, persistent, machine-readable storage media 1990-2 having stored therein software 1995 and/or instructions executable by processing circuitry 1960. Software 1995 can include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and can be run by a corresponding virtualization layer 1950 or hypervisor. Different embodiments of the instance of virtual appliance 1920 can be implemented on one or more of virtual machines 1940, and the implementations can be made in different ways.

During operation, processing circuitry 1960 executes software 1995 to instantiate the hypervisor or virtualization layer 1950, which can sometimes be referred to as a virtual machine monitor (VMM). Virtualization layer 1950 can present a virtual operating platform that appears like networking hardware to virtual machine 1940.

As shown in FIG. 19, hardware 1930 can be a standalone network node with generic or specific components. Hardware 1930 can comprise antenna 19225 and can implement some functions via virtualization. Alternatively, hardware 1930 can be part of a larger cluster of hardware (e.g., such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1940 can be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

In the context of NFV, Virtual Network Function (VNF) is responsible for handling specific network functions that run in one or more virtual machines 1940 on top of hardware networking infrastructure 1930, and can correspond to application 1920 in FIG. 19.

In some embodiments, one or more radio units 19200 that each include one or more transmitters 19220 and one or more receivers 19210 can be coupled to one or more antennas 19225. Radio units 19200 can communicate directly with hardware nodes 1930 via one or more appropriate network interfaces and can be used in combination with the virtual components to provide a virtual node with radio capabilities, such as a radio access node or a base station.

In some embodiments, some signaling can be affected with the use of control system 19230 which can alternatively be used for communication between the hardware nodes 1930 and radio units 19200.

Figure 20:
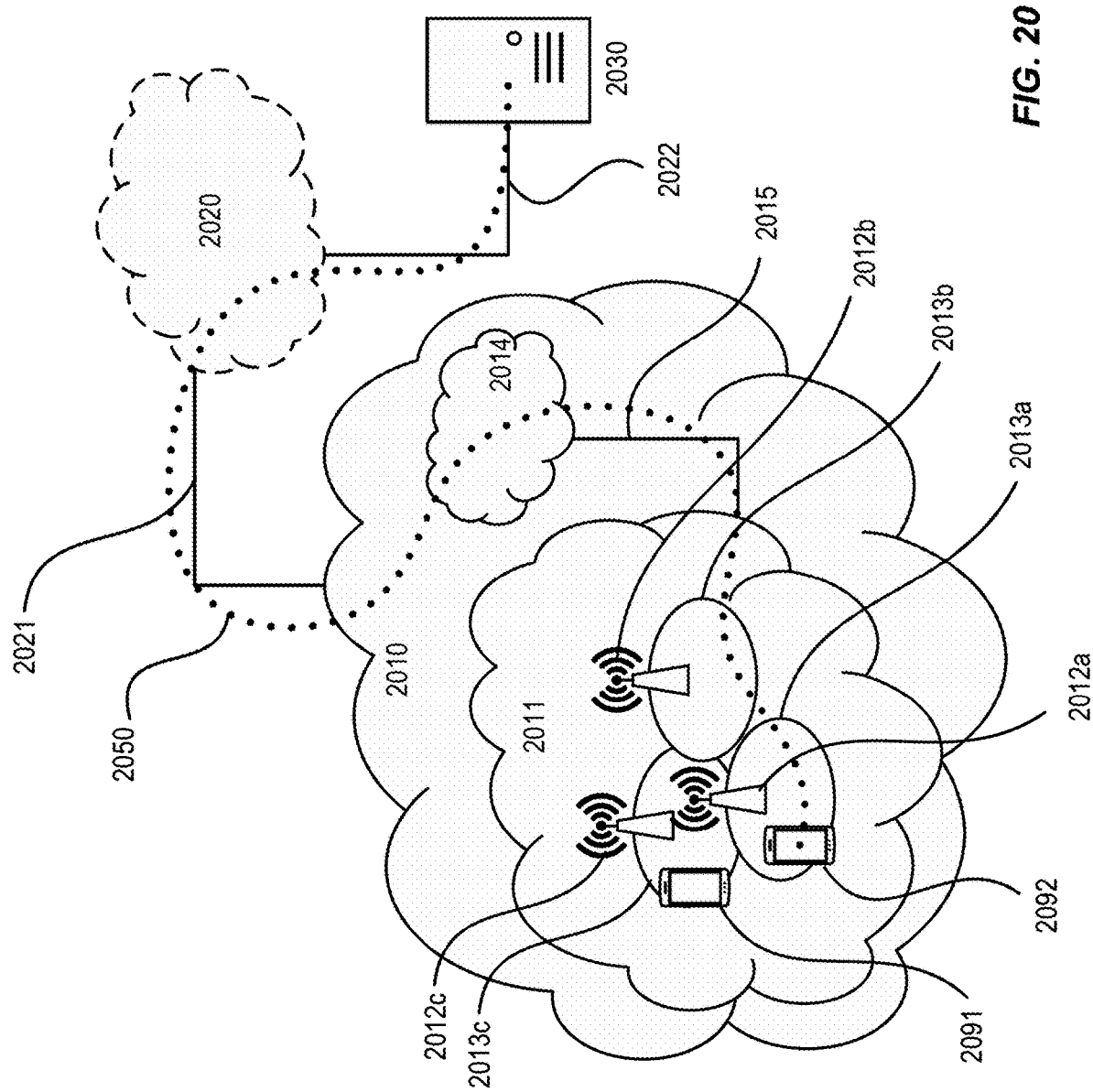
FIGS. 20-21 are block diagrams of various exemplary communication systems and/or networks, in accordance with various exemplary embodiments of the present disclosure.

With reference to FIG. 20, in accordance with an embodiment, a communication system includes telecommunication network 2010, such as a 3GPP-type cellular network, which comprises access network 2011, such as a radio access network, and core network 2020. Access network 2011 comprises a plurality of base stations 2012a, 2012b, 2012c, such as NBs, eNBs, gNBs or other types of wireless access points, each defining a corresponding coverage area 2013a, 2013b, 2013c. Each base station 2012a, 2012b, 2012c is connectable to core network 2014 over a wired or wireless connection 2015. A first UE 2091 located in coverage area 2013c can be configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the Telecommunication network 2010 is itself connected to host computer 2030, which can be embodied in the hardware and/or software of a standalone server, a cloud-implemented server, a distributed server or as processing resources in a server farm. Host computer 2030 can be under the ownership or control of a service provider, or can be operated by the service provider or on behalf of the service provider. Connections 2021 and 2022 between telecommunication network 2010 and host computer 2030 can extend directly from core network 2014 to host computer 2030 or can go via an optional intermediate network 2020. Intermediate network 2020 can be one of, or a combination of more than one of, a public, private or hosted network; intermediate network 2020, if any, can be a backbone network or the Internet; in particular, intermediate network 2020 can comprise two or more sub-networks (not shown).

The communication system of FIG. 20 as a whole enables connectivity between the connected UEs 2091, 2092 and host computer 2030. The connectivity can be described as an over-the-top (OTT) connection 2050. Host computer 2030 and the connected UEs 2091, 2092 are configured to communicate data and/or signaling via OTT connection 2050, using access network 2011, core network 2020, any intermediate network 2020 and possible further infrastructure (not shown) as intermediaries. OTT connection 2050 can be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Example implementations, in accordance with an embodiment, of the UE, base station and host computer discussed in the preceding paragraphs will now be described with reference to FIG. 21. In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which can have storage and/or processing capabilities. In particular, processing circuitry 2118 can comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 can be operable to provide a service to a remote user, such as UE 2130 connecting via OTT connection 2150 terminating at UE 2130 and host computer 2110. In providing the service to the remote user, host application 2112 can provide user data which is transmitted using OTT connection 2150.

Communication system 2100 can also include base station 2120 provided in a telecommunication system and comprising hardware 2125 enabling it to communicate with host computer 2110 and with UE 2130. Hardware 2125 can include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 can be configured to facilitate connection 2160 to host computer 2110. Connection 2160 can be direct, or it can pass through a core network (not shown in FIG. 21) of the telecommunication system and/or through one or more intermediate networks outside the telecommunication system. In the embodiment shown, hardware 2125 of base station 2120 can also include processing circuitry 2128, which can comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 can also include UE 2130, whose hardware 2135 can include radio interface 2137 configured to set up and maintain wireless connection 2170 with a base station serving a coverage area in which UE 2130 is currently located. Hardware 2135 can also include processing circuitry 2138, which can comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 can be operable to provide a service to a human or non-human user via UE 2130, with the support of host computer 2110. In host computer 2110, an executing host application 2112 can communicate with the executing client application 2132 via OTT connection 2150 terminating at UE 2130 and host computer 2110. In providing the service to the user, client application 2132 can receive request data from host application 2112 and provide user data in response to the request data. OTT connection 2150 can transfer both the request data and the user data. Client application 2132 can interact with the user to generate the user data that it provides.

Figure 21:
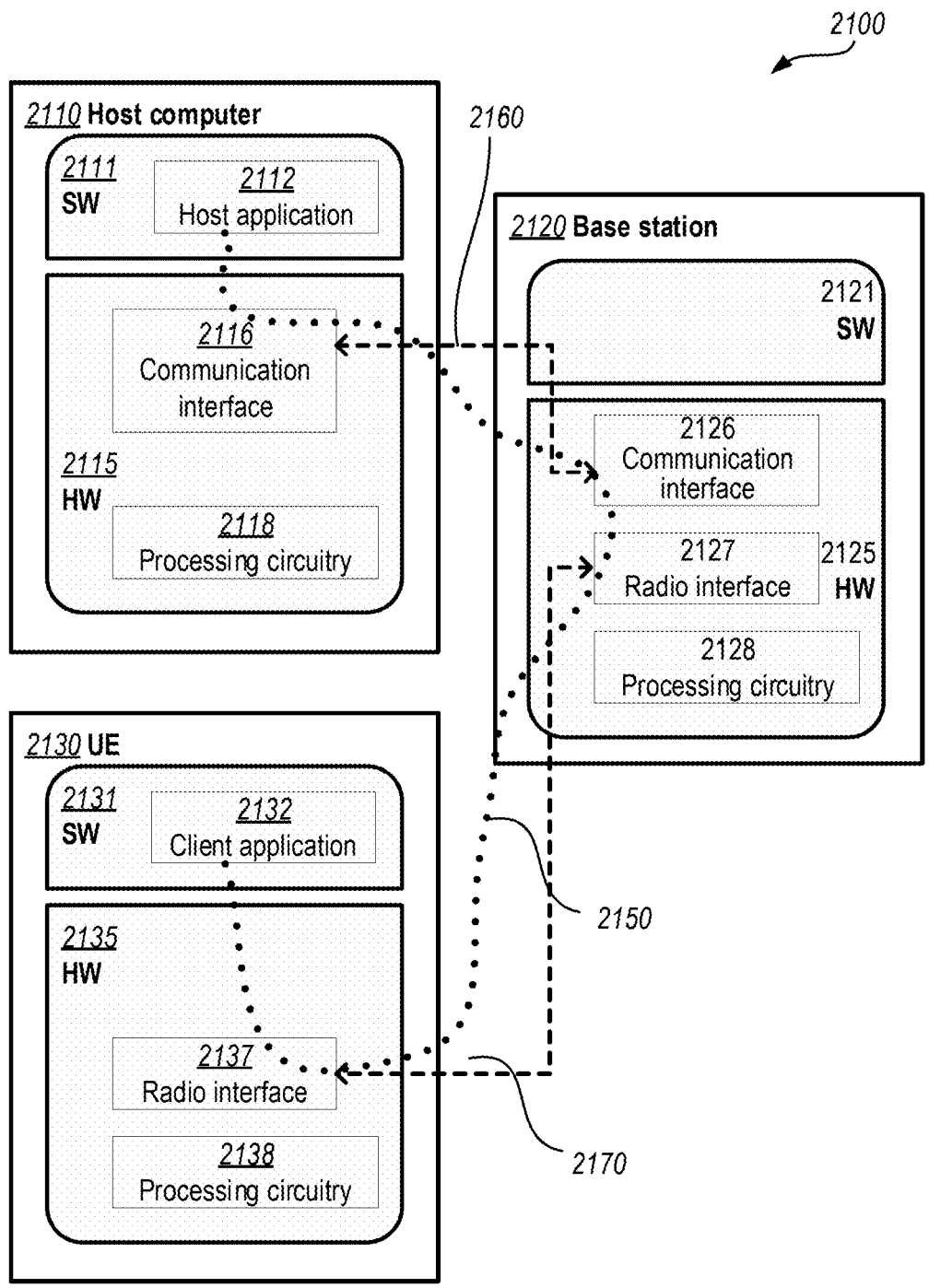

It is noted that host computer 2110, base station 2120 and UE 2130 illustrated in FIG. 21 can be similar or identical to host computer 2030, one of base stations 2012a, 2012b, 2012c and one of UEs 2091, 2092 of FIG. 20, respectively. This is to say, the inner workings of these entities can be as shown in FIG. 21 and independently, the surrounding network topology can be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure can determine the routing, which it can be configured to hide from UE 2130 or from the service provider operating host computer 2110, or both. While OTT connection 2150 is active, the network infrastructure can further take decisions by which it dynamically changes the routing (e.g., on the basis of load balancing consideration or reconfiguration of the network).

Wireless connection 1370 between the UE 1330 and the base station 1320 is in accordance with the teachings of the embodiments described throughout this disclosure. One or more of the various embodiments can be used to improve the performance of OTT services provided to the UE 1330 using the OTT connection 1350, in which the wireless connection 1370 forms the last segment. For example, enabling timely and efficient establishment of ANR between cells for a UE operating in multi-RAT multi-connectivity can be experienced by RAN users (e.g., UEs) as higher and/or more consistent data throughput (e.g., in bits/sec), reduced data latency (e.g., less OTT application buffering), and more reliable OTT application performance.

A measurement procedure can be provided for the purpose of monitoring data rate, latency and other network operational aspects on which the one or more embodiments improve. There can further be an optional network functionality for reconfiguring OTT connection 2150 between host computer 2110 and UE 2130, in response to variations in the measurement results. The measurement procedure and/or the network functionality for reconfiguring OTT connection 2150 can be implemented in software 2111 and hardware 2121 of host computer 2110 or in software 2131 and hardware 2135 of UE 2130, or both. In embodiments, sensors (not shown) can be deployed in or in association with communication devices through which OTT connection 2150 passes; the sensors can participate in the measurement procedure by supplying values of the monitored quantities exemplified above, or supplying values of other physical quantities from which software 2111, 2131 can compute or estimate the monitored quantities. The reconfiguring of OTT connection 2150 can include message format, retransmission settings, preferred routing etc.; the reconfiguring need not affect base station 2120, and it can be unknown or imperceptible to base station 2120. Such procedures and functionalities can be known and practiced in the art. In certain embodiments, measurements can involve proprietary UE signaling facilitating host computer 2110's measurements of throughput, propagation times, latency and the like. The measurements can be implemented in that software 2111 and 2131 causes messages to be transmitted, in particular empty or 'dummy' messages, using OTT connection 2150 while it monitors propagation times, errors etc.

Figure 22:
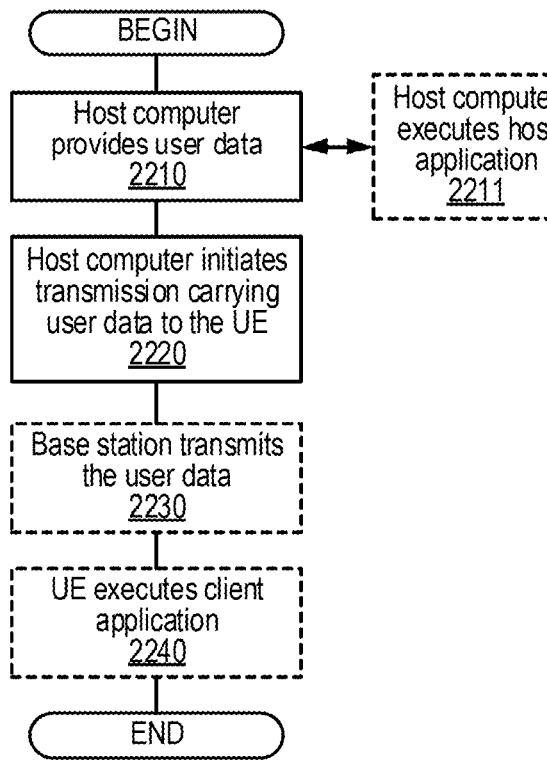
FIGS. 22-25 are flow diagrams illustrating various exemplary methods and/or procedures implemented in a communication system, according to various exemplary embodiments of the present disclosure.

FIG. 22 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 22 will be included in this section. In step 2210, the host computer provides user data. In substep 2211 (which can be optional) of step 2210, the host computer provides the user data by executing a host application. In step 2220, the host computer initiates a transmission carrying the user data to the UE. In step 2230 (which can be optional), the base station transmits to the UE the user data which was carried in the transmission that the host computer initiated, in accordance with the teachings of the embodiments described throughout this disclosure. In step 2240 (which can also be optional), the UE executes a client application associated with the host application executed by the host computer.

Figure 23:
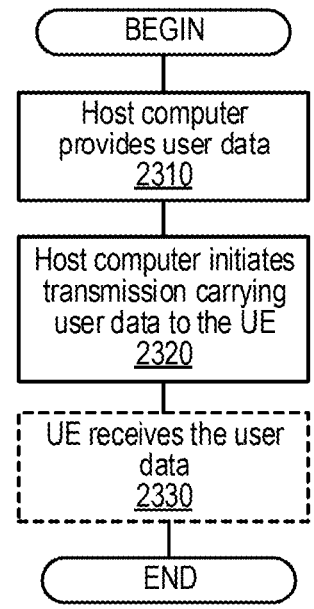

FIG. 23 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission can pass via the base station, in accordance with the teachings of the embodiments described throughout this disclosure. In step 2330 (which can be optional), the UE receives the user data carried in the transmission.

Figure 24:
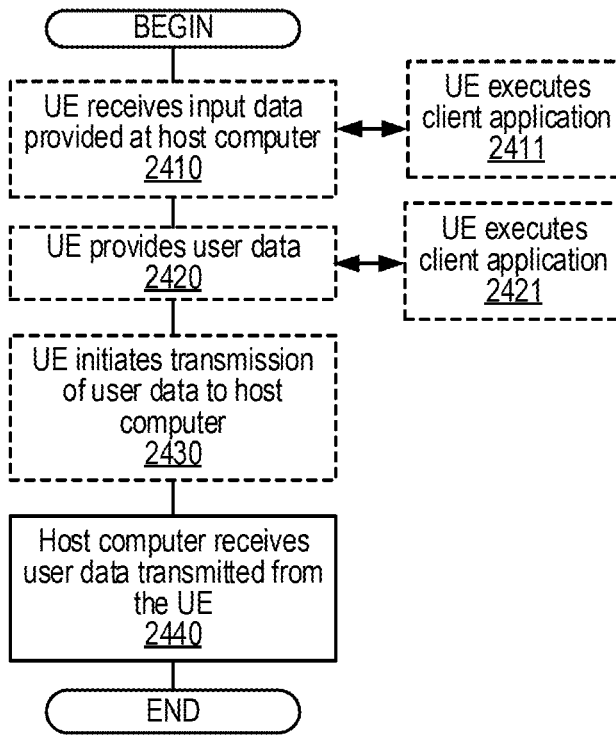

FIG. 24 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 24 will be included in this section. In step 2410 (which can be optional), the UE receives input data provided by the host computer. Additionally or alternatively, in step 2420, the UE provides user data. In substep 2421 (which can be optional) of step 2420, the UE provides the user data by executing a client application. In substep 2411 (which can be optional) of step 2410, the UE executes a client application which provides the user data in reaction to the received input data provided by the host computer. In providing the user data, the executed client application can further consider user input received from the user. Regardless of the specific manner in which the user data was provided, the UE initiates, in substep 2430 (which can be optional), transmission of the user data to the host computer. In step 2440 of the method, the host computer receives the user data transmitted from the UE, in accordance with the teachings of the embodiments described throughout this disclosure.

Figure 25:
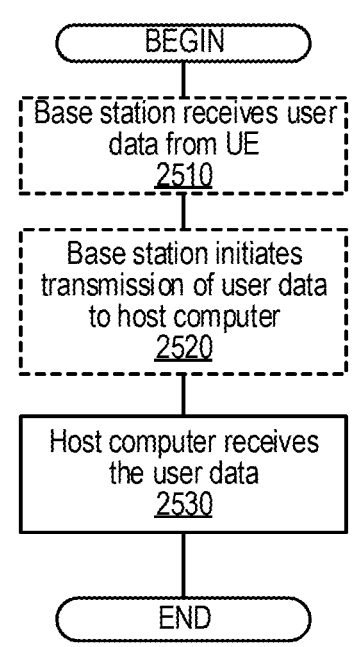

FIG. 25 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 25 will be included in this section. In step 2510 (which can be optional), in accordance with the teachings of the embodiments described throughout this disclosure, the base station receives user data from the UE. In step 2520 (which can be optional), the base station initiates transmission of the received user data to the host computer. In step 2530 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for a network node to establish a connection with a user equipment (UE) operating in dual connectivity (DC) with a primary cell of a first radio access technology (RAT) served by a master node (MN) and with a secondary cell of a second RAT served by a secondary node (SN) of the serving cell, the method comprising:
   receiving, from the UE, a re-establishment request message comprising:
      an indication of the UE's selection of a further cell served by the network node for re-establishment as the primary cell for the DC, wherein the further cell is of the second RAT;
      a plurality of parameters associated with the SN; and
      a message authentication code (MAC) calculated based on a plurality of parameters associated with the MN;
   based on the plurality of parameters, determining a first identifier of the UE associated with the MN and an identifier of the primary cell;
   sending, to either the MN or the SN, a context request message comprising the first UE identifier, the primary cell identifier, the MAC, and a request for a UE context associated with the UE identifier;
   receiving, from either the MN or the SN, a context response message comprising the UE context and a second identifier of the UE; and
   re-establishing the further cell as the primary cell for the UE DC.

2. The method of embodiment 1, further comprising sending, to the UE, a connection re-establishment message indicating the further cell as the primary cell for UE DC.

3. The method of any of embodiments 1-2, wherein the first RAT is New Radio (NR) and the second RAT is Long-Term Evolution Evolved UTRA (LTE E-UTRA).

4. The method of any of embodiments 1-2, wherein the second RAT is New Radio (NR) and the first RAT is Long-Term Evolution Evolved UTRA (LTE E-UTRA).

5. A method performed by a user equipment (UE) operating in dual connectivity (DC) with a primary cell of a first radio access technology (RAT) served by a master node (MN) and with a secondary cell of a second RAT served by a secondary node (SN), the method comprising:
   detecting a failure associated with the primary cell served by the MN;
   selecting a further cell for re-establishment as the primary cell for DC;
   calculating a message authentication code (MAC) for a re-establishment request message based on a plurality of parameters associated with the MN, wherein if the selected further cell is of the second RAT, the calculating includes converting one or more of the plurality of parameters into respective formats associated with the first RAT; and
sending the re-establishment request message, including the calculated MAC, to a network node serving the further cell.
6. The method of embodiment 5, wherein the first RAT is New Radio (NR) and the second RAT is Long-Term Evolution Evolved UTRA (LTE E-UTRA).
7. The method of embodiment 5, wherein the second RAT is New Radio (NR) and the first RAT is Long-Term Evolution Evolved UTRA (LTE E-UTRA).
8. The method of any of embodiments 5-7, wherein the network node serving the further cell is the SN.
9. The method of any of embodiments 5-7, wherein the network node serving the further cell is different than the SN.
10. The method of any of embodiments 5-9, further comprising receiving, from the network node, a connection re-establishment message indicating the further cell as the primary cell.
11. A network node configured to establish a connection with a user equipment (UE) operating in dual connectivity (DC) with a primary cell of a first radio access technology (RAT) served by a master node (MN) and with a secondary cell of a second RAT served by a secondary node (SN) of the serving cell, the network node comprising:
  a communication interface; and
  processing circuitry operably coupled to the communication interface and configured to perform any operations of any of embodiments 1-4; and
  power supply circuitry configured to supply power to the network node.
12. A user equipment (UE) configured to operate in dual connectivity (DC) with a primary cell of a first radio access technology (RAT) served by a master node (MN) and with a secondary cell of a second RAT served by a secondary node (SN), the UE comprising:
  a communication interface; and
  processing circuitry operably coupled to the communication interface and configured to perform any operations of any of embodiments 5-10; and
  power supply circuitry configured to supply power to the UE.
13. A communication system including a host computer comprising:
  processing circuitry configured to provide user data; and
  a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-4.
14. The communication system of the previous embodiment further including the base station.
15. The communication system of the previous two embodiments, further including the UE, wherein the UE includes a radio interface and processing circuitry configured to communicate with the base station and cooperatively perform any of the operations comprising embodiments 5-10.
16. The communication system of the previous three embodiments, wherein:
  the processing circuitry of the host computer is configured to execute a host application, thereby providing the user data; and
  the UE's processing circuitry is further configured to execute a client application associated with the host application.
17. A method implemented in a communication system including a host computer, a base station, and a User Equipment (UE), the method comprising:
  at the host computer, providing user data;
  at the host computer, initiating a transmission carrying the user data to the UE via a cellular network comprising the base station; and
  at the base station, performing operations corresponding to any of embodiments 1-4.
18. The method of the previous embodiment, further comprising, at the base station, transmitting the user data.
19. The method of the previous two embodiments, wherein the user data is provided at the host computer by executing a host application, the method further comprising, at the UE, executing a client application associated with the host application.
20. The method of the previous three embodiments, further comprising, at the UE, performing operations corresponding to any of embodiments 5-10.
21. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 1-4.
22. The communication system of the previous embodiment further including the base station.
23. The communication system of the previous two embodiments, further including the UE, wherein the UE includes a radio interface and processing circuitry configured to communicate with the base station and perform any of the operations comprising embodiments 5-10.
24. The communication system of the previous three embodiments, wherein:
  the processing circuitry of the host computer is configured to execute a host application; and
  the UE is further configured to execute a client application associated with the host application, thereby providing the user data to be received by the host computer.

The invention claimed is:
1. A method for a target node, in a radio access network (RAN), to establish a connection with a user equipment (UE) operating in dual connectivity (DC) with a master cell group (MCG) comprising a primary cell (PCell) served by a master node (MN) and with a secondary cell group (SCG) comprising a primary secondary cell (PSCell) served by a secondary node (SN), the method comprising:
  receiving, from the UE, a re-establishment request message comprising:
    a plurality of parameters associated with the PSCell,
    a message authentication code (MAC), and
    an indication of the UE's selection of a target cell served by the target node as a replacement for the PCell, the MAC being based on a plurality of parameters associated with the PCell and on an identifier of the target cell, the plurality of parameters associated with the PCell including an identifier of the PCell, an identifier of the UE in relation to the PCell, and integrity protection information associated with the MN, and:
    the PCell utilizing a first radio access technology (RAT), and the PSCell and the target cell utilizing a second RAT different from the first RAT;

based on the plurality of parameters associated with the PSCell, determining a full UE context for the UE; and establishing a connection with the UE based on the full UE context, whereby the target cell served by the target node will serve as a PCell for DC.

2. The method of claim 1 wherein determining the full UE context comprises:

performing the following operations based on the plurality of parameters associated with the PSCell:

determining that the target network node is the same as the SN;

retrieving a UE context associated with the SN, wherein the UE context associated with the SN includes a first identifier of the UE in relation to the MN;

sending, to the MN, a context request message including the first identifier of the UE in relation to the MN; and receiving, from the MN, a context response message including the full UE context.

3. The method of claim 1, wherein determining the full UE context comprises:

based on the plurality of parameters associated with the PSCell, determining that the target node is different than the SN;

sending, to the SN, a context request message including the plurality of parameters associated with the PSCell; and receiving, from the MN, a context response message including the full UE context.

4. The method of claim 2, wherein the context request message also includes one or more of the following: the MAC, and an identifier of the target cell.

5. The method of claim 2, wherein the context request message and the context response message also include an identifier of the UE in relation to the target node.

6. The method of claim 1, wherein establishing the connection with the UE comprises:

sending a connection re-establishment message to the UE over a first signaling radio bearer (SRB) via the target cell; and sending a connection reconfiguration message to the UE over the first SRB via the target cell.

7. The method of claim 6, wherein the connection reconfiguration message is sent without waiting for a response to the configuration establishment message.

8. The method of claim 1, wherein establishing the connection with the UE comprises sending a connection reconfiguration message to the UE over a first signaling radio bearer (SRB) via the target cell, wherein the connection re-establishment message includes fields usable to configure at least one of the following between the target node and the UE: one or more additional SRBs, and one or more data radio bearers (DRBs).

9. The method of claim 1, wherein the plurality of parameters associated with the PSCell include: an identifier of the PSCell, and an identifier of the UE in relation to the PSCell.

10. A network node, of a radio access network, RAN, configured to operate in dual connectivity towards a user equipment, UE together with a further network node in the RAN, the network node comprising:

interface circuitry operable to communicate with the UE and with at least the further network node in the RAN to receive, from the UE, a re-establishment request message including a plurality of parameters associated with the PSCell, a message authentication code (MAC), and an indication of the UE's selection of a target cell served by the target node as a replacement for the PCell, the MAC being based on a plurality of parameters associated with the PCell and on an identifier of the target cell, the plurality of parameters associated with the PCell including an identifier of the PCell, an identifier of the UE in relation to the PCell, and integrity protection information associated with the MN, and the PCell utilizing a first radio access technology (RAT), and the PSCell and the target cell utilizing a second RAT different from the first RAT; and processing circuitry operably coupled to the interface circuitry, whereby the processing circuitry and the interface circuitry are configured to perform operations which, based on the plurality of parameters associated with the PSCell, determines a full UE context for the UE and establishes a connection with the UE based on the full UE context whereby the target cell served by the target node will serve as a PCell for DC.

11. The network node of claim 10, wherein determining the full UE context comprises:

performing the following operations based on the plurality of parameters associated with the PSCell:

determining that the target network node is the same as the SN;

retrieving a UE context associated with the SN, wherein the UE context associated with the SN includes a first identifier of the UE in relation to the MN;

sending, to the MN, a context request message including the first identifier of the UE in relation to the MN; and receiving, from the MN, a context response message including the full UE context.

12. The network node of claim 10, wherein determining the full UE context comprises:

based on the plurality of parameters associated with the PSCell, determining that the target node is different than the SN;

sending, to the SN, a context request message including the plurality of parameters associated with the PSCell; and receiving, from the MN, a context response message including the full UE context.

13. The network node of claim 11, wherein the context request message also includes one or more of the following: the MAC, and an identifier of the target cell.

14. The network node of claim 11, wherein the context request message and the context response message also include an identifier of the UE in relation to the target node.

15. The network node of claim 10, wherein establishing the connection with the UE comprises:

sending a connection re-establishment message to the UE over a first signaling radio bearer (SRB) via the target cell; and sending a connection reconfiguration message to the UE over the first SRB via the target cell.

16. The network node of claim 15, wherein the connection reconfiguration message is sent without waiting for a response to the configuration establishment message.

* * * * *